US011835646B2

(12) United States Patent
Jefferies et al.

(10) Patent No.: US 11,835,646 B2
(45) Date of Patent: Dec. 5, 2023

(54) TARGET ALIGNMENT FOR VEHICLE SENSOR CALIBRATION

(71) Applicant: BPG Sales and Technology Investments, LLC, Ada, MI (US)

(72) Inventors: Ryan M. Jefferies, Grand Rapids, MI (US); David M. DeBoer, Grand Rapids, MI (US); Jon D. Lawrence, Corvallis, OR (US)

(73) Assignee: BPG Sales and Technology Investments, LLC, Ada, MI (US)

( * ) Notice: Subject to any disclaimer, the term of this patent is extended or adjusted under 35 U.S.C. 154(b) by 232 days.

(21) Appl. No.: 17/491,746

(22) Filed: Oct. 1, 2021

(65) Prior Publication Data

US 2022/0018935 A1     Jan. 20, 2022

Related U.S. Application Data

(63) Continuation-in-part of application No. 16/926,664, filed on Jul. 11, 2020, now Pat. No. 11,243,074, and a continuation-in-part of application No. 16/731,340, filed on Dec. 31, 2019, now Pat. No. 11,597,091, which is a continuation-in-part of application No. 16/398,404, filed on Apr. 30, 2019, now Pat. No.
(Continued)

(51) Int. Cl.
*G01S 7/40* (2006.01)
*G01B 11/275* (2006.01)

(52) U.S. Cl.
CPC .......... *G01S 7/4026* (2013.01); *G01B 11/275* (2013.01)

(58) Field of Classification Search
CPC .......... G01S 7/4026; G01S 2013/9323; G01S 7/4086; G01B 11/275; G01B 11/2755
See application file for complete search history.

(56) References Cited

U.S. PATENT DOCUMENTS 3,288,020 A    11/1966  Lill
3,630,623 A    12/1971  Schirmer
(Continued)

FOREIGN PATENT DOCUMENTS

CN      1764818 A      4/2006
CN      100373129      3/2008
(Continued)

OTHER PUBLICATIONS

ISRA Vision Systems Press Release, No. 97, May 16, 2006 "Mounting Wheels Automatically On Moving Car Bodies".
(Continued)

*Primary Examiner* — Behrang Badii
(74) *Attorney, Agent, or Firm* — Gardner, Linn, Burkhart & Ondersma LLP

(57) ABSTRACT

A system and method for aligning a target to an equipped vehicle for calibration of a sensor on the equipped vehicle includes a vehicle support stand upon which an equipped vehicle is disposed in an established known position for calibration of the sensor, and a target adjustment stand configured to moveably hold a target. The target adjustment stand is configured to position the target into a calibration position relative to the sensor on the equipped vehicle based on the established known position of the equipped vehicle on the vehicle support stand whereby the sensor is able to be calibrated using the target.

20 Claims, 11 Drawing Sheets

Related U.S. Application Data

11,624,608, application No. 17/491,746 is a continuation-in-part of application No. 16/398,404, filed on Apr. 30, 2019, now Pat. No. 11,624,608.

(60) Provisional application No. 63/086,116, filed on Oct. 1, 2020, provisional application No. 63/040,083, filed on Jun. 17, 2020, provisional application No. 62/872,908, filed on Jul. 11, 2019, provisional application No. 62/798,268, filed on Jan. 29, 2019, provisional application No. 62/786,896, filed on Dec. 31, 2018, provisional application No. 62/664,323, filed on Apr. 30, 2018.

(56) References Cited

U.S. PATENT DOCUMENTS

| | | | |
|---|---|---|---|
| 3,918,816 A | 11/1975 | Foster et al. | |
| 4,249,824 A | 2/1981 | Wiederrich et al. | |
| 4,303,338 A | 12/1981 | Morrison et al. | |
| 4,337,581 A | 7/1982 | Eck | |
| 4,416,065 A | 11/1983 | Hunter | |
| 4,444,496 A | 4/1984 | Dale, Jr. | |
| 4,639,878 A | 1/1987 | Day et al. | |
| 4,647,208 A | 3/1987 | Bieman | |
| 4,690,557 A | 9/1987 | Wiklund | |
| 4,724,480 A | 2/1988 | Hecker et al. | |
| 4,726,122 A | 2/1988 | Andersson | |
| 4,863,266 A | 9/1989 | Masuko et al. | |
| RE33,144 E | 1/1990 | Hunter et al. | |
| 4,899,218 A | 2/1990 | Waldecker et al. | |
| 4,931,964 A | 6/1990 | Titsworth et al. | |
| 5,018,853 A | 5/1991 | Hechel et al. | |
| 5,044,746 A | 9/1991 | Henseli | |
| 5,048,954 A | 9/1991 | Madey et al. | |
| 5,054,918 A | 10/1991 | Downing et al. | |
| 5,140,533 A | 8/1992 | Celette | |
| 5,177,558 A | 1/1993 | Hill | |
| 5,177,563 A | 1/1993 | Everett et al. | |
| 5,198,877 A | 3/1993 | Schulz | |
| 5,249,364 A | 10/1993 | Bishop | |
| 5,259,246 A | 11/1993 | Stuyts | |
| 5,268,731 A | 12/1993 | Fuchiwaki et al. | |
| 5,274,433 A | 12/1993 | Madey et al. | |
| 5,291,264 A | 3/1994 | Longa et al. | |
| 5,489,983 A | 2/1996 | McClenahan et al. | |
| 5,519,489 A | 5/1996 | McClenahan et al. | |
| 5,532,816 A | 7/1996 | Spann et al. | |
| 5,559,695 A * | 9/1996 | Daily .................. | G01S 11/12 |
| | | | 701/1 |
| 5,583,797 A | 12/1996 | Fluegge et al. | |
| 5,600,893 A | 2/1997 | Phillips | |
| 5,675,408 A | 10/1997 | Samuelsson et al. | |
| 5,703,796 A | 12/1997 | Moradi et al. | |
| 5,724,129 A | 3/1998 | Matteucci | |
| 5,724,743 A | 3/1998 | Jackson | |
| 5,731,870 A | 3/1998 | Bartko et al. | |
| 5,760,938 A | 6/1998 | Hodge | |
| 5,781,286 A | 7/1998 | Knestel | |
| 5,812,256 A | 9/1998 | Chapin et al. | |
| 5,815,257 A | 9/1998 | Haas | |
| 5,818,574 A | 10/1998 | Jones et al. | |
| 5,870,315 A | 2/1999 | January | |
| 5,930,881 A | 8/1999 | Naruse et al. | |
| 5,978,077 A | 11/1999 | Koerner et al. | |
| 6,078,846 A | 6/2000 | Greer et al. | |
| 6,100,923 A | 8/2000 | Sass et al. | |
| 6,115,927 A | 9/2000 | Hendrix | |
| 6,148,528 A | 11/2000 | Jackson | |
| 6,161,419 A | 12/2000 | Langlechner | |
| 6,226,879 B1 | 5/2001 | Baird | |
| 6,285,959 B1 | 9/2001 | Greer | |
| 6,363,619 B1 | 4/2002 | Schirmer et al. | |
| 6,397,164 B1 | 5/2002 | Nobis et al. | |
| 6,400,451 B1 | 6/2002 | Fukuda et al. | |
| 6,404,486 B1 | 6/2002 | Nobis et al. | |
| 6,412,183 B1 | 7/2002 | Uno | |
| 6,424,411 B1 | 7/2002 | Rapidel et al. | |
| 6,456,372 B1 | 9/2002 | Hudy | |
| 6,473,978 B1 | 11/2002 | Maas | |
| 6,483,577 B2 | 11/2002 | Stieff | |
| 6,522,400 B1 | 2/2003 | Horn | |
| 6,532,673 B2 | 3/2003 | Jahn et al. | |
| 6,542,840 B2 | 4/2003 | Okamoto et al. | |
| 6,545,750 B2 | 4/2003 | Roth et al. | |
| 6,559,936 B1 | 5/2003 | Colombo et al. | |
| 6,640,612 B2 | 11/2003 | Corghi | |
| 6,657,711 B1 | 12/2003 | Kitagawa et al. | |
| 6,658,749 B2 | 12/2003 | Jackson et al. | |
| 6,658,751 B2 | 12/2003 | Jackson et al. | |
| 6,690,456 B2 | 2/2004 | Bux et al. | |
| 6,691,062 B1 | 2/2004 | Nobis | |
| 6,707,557 B2 | 3/2004 | Young, Jr. et al. | |
| 6,710,866 B1 | 3/2004 | Adolph | |
| 6,714,291 B2 | 3/2004 | Castagnoli et al. | |
| 6,731,382 B2 | 5/2004 | Jackson et al. | |
| 6,744,497 B2 | 6/2004 | Burns, Jr. | |
| 6,748,796 B1 | 6/2004 | Van Den Bossche | |
| 6,765,664 B2 | 7/2004 | Groothuis et al. | |
| 6,766,229 B2 | 7/2004 | Dry et al. | |
| 6,796,035 B2 | 9/2004 | Jahn et al. | |
| 6,796,043 B2 | 9/2004 | Jackson et al. | |
| 6,802,130 B2 | 10/2004 | Podbielski et al. | |
| 6,813,015 B2 | 11/2004 | Knoedler et al. | |
| 6,823,598 B1 | 11/2004 | Loescher | |
| 6,823,601 B2 | 11/2004 | Murray | |
| 6,829,046 B1 | 12/2004 | Groothuis et al. | |
| 6,836,970 B2 | 1/2005 | Hirano | |
| 6,839,972 B2 | 1/2005 | Jackson et al. | |
| 6,842,238 B2 | 1/2005 | Corghi | |
| 6,879,403 B2 | 4/2005 | Freifeld | |
| 6,912,477 B2 | 6/2005 | Murray | |
| 6,915,228 B2 | 7/2005 | Uffenkamp et al. | |
| 6,931,340 B2 | 8/2005 | Jackson et al. | |
| 6,959,253 B2 | 10/2005 | Jackson et al. | |
| 6,968,282 B1 | 11/2005 | Jackson et al. | |
| 7,062,861 B2 | 6/2006 | O'Mahony et al. | |
| 7,065,462 B2 | 6/2006 | Merrill et al. | |
| 7,075,635 B2 | 7/2006 | Groothuis et al. | |
| 7,121,011 B2 | 10/2006 | Murray et al. | |
| 7,230,694 B2 | 6/2007 | Forster et al. | |
| 7,265,821 B1 | 9/2007 | Lawrence et al. | |
| 7,331,211 B2 | 2/2008 | Harrill | |
| 7,337,650 B1 * | 3/2008 | Preston .................. | G01P 15/02 |
| | | | 73/1.38 |
| 7,352,455 B2 | 4/2008 | Groothuis et al. | |
| 7,380,344 B2 | 6/2008 | Dietrich | |
| 7,382,913 B2 | 6/2008 | Dorranc et al. | |
| 7,424,387 B1 | 9/2008 | Gill et al. | |
| 7,501,980 B2 | 3/2009 | Focke et al. | |
| 7,535,558 B2 | 5/2009 | Uffenkamp et al. | |
| 7,570,352 B2 | 8/2009 | Flannigan et al. | |
| 7,778,748 B2 | 8/2010 | Probst et al. | |
| 7,779,544 B2 | 8/2010 | Tentrup et al. | |
| 7,860,295 B2 | 12/2010 | Donner et al. | |
| 7,864,309 B2 | 1/2011 | De Sloovere et al. | |
| 7,907,265 B2 | 3/2011 | Tentrup et al. | |
| 7,908,751 B2 | 3/2011 | Nobis et al. | |
| 7,974,806 B1 | 7/2011 | Burns et al. | |
| 8,096,057 B2 | 1/2012 | Schommer et al. | |
| 8,107,062 B2 | 1/2012 | De Sloovere et al. | |
| 8,127,599 B2 | 3/2012 | Schommer et al. | |
| 8,131,017 B2 | 3/2012 | Bux et al. | |
| 8,135,514 B2 | 3/2012 | Kelly et al. | |
| 8,150,144 B2 | 4/2012 | Nobis et al. | |
| 8,196,461 B2 | 6/2012 | Abraham et al. | |
| 8,244,024 B2 | 8/2012 | Dorrance et al. | |
| 8,254,666 B2 | 8/2012 | Uffenkamp et al. | |
| 8,274,648 B2 | 9/2012 | Corghi | |
| 8,363,979 B2 | 1/2013 | Abraham et al. | |
| 8,400,624 B2 | 3/2013 | De Sloovere et al. | |
| 8,418,543 B2 | 4/2013 | Tentrup et al. | |
| 8,448,342 B2 | 5/2013 | Nobis et al. | |
| 8,452,552 B2 | 5/2013 | Nobis et al. | |

(56) References Cited

U.S. PATENT DOCUMENTS

| | | |
|---|---|---|
| 8,457,925 B1 | 6/2013 | Stieff et al. |
| 8,489,353 B2 | 7/2013 | Raphael |
| 8,492,701 B2 | 7/2013 | Nobis et al. |
| 8,522,609 B2 | 9/2013 | Nobis et al. |
| 8,538,724 B2 | 9/2013 | Corghi |
| 8,578,765 B2 | 11/2013 | Nobis et al. |
| 8,638,452 B2 | 1/2014 | Muhle et al. |
| 8,650,766 B2 | 2/2014 | Nobis et al. |
| 8,767,382 B2 | 7/2014 | Mori |
| 8,836,764 B2 | 9/2014 | Gruetzmann et al. |
| 8,854,454 B2 | 10/2014 | Abraham et al. |
| 8,918,302 B2 | 12/2014 | Hukkeri et al. |
| 9,001,189 B2 | 4/2015 | Nobis et al. |
| 9,127,937 B2 | 9/2015 | Nobis et al. |
| 9,134,120 B2 | 9/2015 | Schommer et al. |
| 9,170,101 B2 | 10/2015 | Stieff |
| 9,182,477 B2 | 11/2015 | Jones et al. |
| 9,212,907 B2 | 12/2015 | D'Agostino et al. |
| 9,279,670 B2 | 3/2016 | Schommer et al. |
| 9,279,882 B2 | 3/2016 | Hukkeri et al. |
| 9,377,379 B2 | 6/2016 | Lee |
| 9,448,138 B2 | 9/2016 | Stieff et al. |
| 9,539,866 B2 | 1/2017 | Mouchet |
| 9,545,966 B2 | 1/2017 | Kim |
| 9,581,524 B2 | 2/2017 | Liu |
| 9,645,051 B2 | 5/2017 | Jin |
| 9,658,062 B2 | 5/2017 | Duff et al. |
| 9,677,974 B2 | 6/2017 | Lee |
| 9,779,560 B1 | 10/2017 | Dorrance et al. |
| 9,779,561 B1 | 10/2017 | Dorrance et al. |
| 9,791,268 B2 | 10/2017 | Buzzi et al. |
| 10,001,429 B2 | 6/2018 | Krueger et al. |
| 10,068,389 B1 | 9/2018 | Strege et al. |
| 10,139,213 B2 | 11/2018 | Herrmann et al. |
| 10,222,455 B1 | 3/2019 | Stieff et al. |
| 10,240,916 B1 * | 3/2019 | Golab ............... G01B 11/275 |
| 10,241,195 B1 | 3/2019 | Stieff et al. |
| 10,284,777 B2 | 5/2019 | Rogers et al. |
| 10,298,814 B2 | 5/2019 | Harrell et al. |
| 10,347,006 B2 | 7/2019 | Kunert et al. |
| 10,365,095 B2 | 7/2019 | D'Agostino et al. |
| 10,436,885 B2 * | 10/2019 | Wheeler ............ G01C 21/1652 |
| 10,444,010 B2 | 10/2019 | Strege et al. |
| 10,475,201 B1 | 11/2019 | Hall et al. |
| 10,514,323 B2 | 12/2019 | Corghi |
| 10,567,650 B2 | 2/2020 | Rogers et al. |
| 10,634,488 B2 | 4/2020 | Stieff et al. |
| 10,670,392 B2 | 6/2020 | Rogers et al. |
| 10,684,125 B2 | 6/2020 | D'Agostino et al. |
| 10,692,241 B2 | 6/2020 | Kunert et al. |
| 10,692,308 B2 | 6/2020 | Cho et al. |
| 10,697,766 B1 | 6/2020 | Dorrance et al. |
| 10,788,400 B2 | 9/2020 | Stieff et al. |
| 10,848,316 B1 | 11/2020 | Stieff et al. |
| 10,871,368 B2 | 12/2020 | Krueger |
| 11,061,120 B2 * | 7/2021 | Castorena Martinez ................... G01C 11/06 |
| 11,243,074 B2 | 2/2022 | DeBoer |
| 2002/0020071 A1 | 2/2002 | Jackson et al. |
| 2002/0099483 A1 | 7/2002 | Jackson et al. |
| 2004/0049930 A1 | 3/2004 | Murray |
| 2005/0022587 A1 | 2/2005 | Tentrup et al. |
| 2005/0096807 A1 | 5/2005 | Murray et al. |
| 2006/0090356 A1 | 5/2006 | Stieff |
| 2006/0274303 A1 | 12/2006 | Jackson et al. |
| 2006/0279728 A1 | 12/2006 | Dorrance et al. |
| 2008/0007722 A1 | 1/2008 | Golab et al. |
| 2008/0148581 A1 | 6/2008 | Boni et al. |
| 2008/0186514 A1 | 8/2008 | Uffenkamp et al. |
| 2009/0046279 A1 | 2/2009 | Tentrup et al. |
| 2010/0060885 A1 | 3/2010 | Nobis et al. |
| 2010/0238291 A1 | 9/2010 | Pavlov et al. |
| 2010/0321674 A1 | 12/2010 | Corghi |
| 2011/0077900 A1 | 3/2011 | Corghi |
| 2011/0271749 A1 | 11/2011 | Tentrup et al. |
| 2012/0092654 A1 | 4/2012 | De Sloovere et al. |
| 2013/0110314 A1 | 5/2013 | Stieff |
| 2013/0188020 A1 | 7/2013 | Seifert et al. |
| 2013/0325252 A1 | 12/2013 | Schommer et al. |
| 2014/0129076 A1 | 5/2014 | Mouchet et al. |
| 2014/0253908 A1 | 9/2014 | Lee |
| 2014/0253909 A1 * | 9/2014 | McClenahan ...... G01B 11/2755 356/139.09 |
| 2014/0278226 A1 | 9/2014 | Stieff et al. |
| 2015/0049188 A1 | 2/2015 | Harrell et al. |
| 2015/0049199 A1 | 2/2015 | Rogers et al. |
| 2015/0134191 A1 | 5/2015 | Kim |
| 2016/0334209 A1 | 11/2016 | Linson |
| 2017/0003141 A1 | 1/2017 | Voeller et al. |
| 2017/0097229 A1 | 4/2017 | Rogers et al. |
| 2018/0052223 A1 * | 2/2018 | Stieff .................. G01B 11/026 |
| 2018/0060036 A1 | 3/2018 | Frisch et al. |
| 2018/0075675 A1 | 3/2018 | Kim |
| 2018/0094922 A1 | 4/2018 | Oki et al. |
| 2018/0100783 A1 | 4/2018 | Stieff et al. |
| 2018/0134529 A1 | 5/2018 | Zecher et al. |
| 2018/0188022 A1 * | 7/2018 | Leikert .............. G01B 11/2755 |
| 2018/0259424 A1 | 9/2018 | Tentrup |
| 2018/0276910 A1 | 9/2018 | Pitt et al. |
| 2018/0299533 A1 | 10/2018 | Pliefke et al. |
| 2019/0204184 A1 | 7/2019 | Neumann et al. |
| 2019/0222723 A1 | 7/2019 | Harrell et al. |
| 2019/0249985 A1 | 8/2019 | Steiff et al. |
| 2019/0279395 A1 | 9/2019 | Kunert et al. |
| 2019/0331482 A1 | 10/2019 | Lawrence et al. |
| 2020/0074675 A1 | 3/2020 | Cejka |
| 2020/0088515 A1 | 3/2020 | Rogers et al. |
| 2020/0117210 A1 * | 4/2020 | Ren ....................... G08G 1/165 |
| 2020/0130188 A1 | 4/2020 | Lawrence et al. |
| 2020/0141724 A1 | 5/2020 | Lawrence et al. |
| 2020/0273206 A1 | 8/2020 | Corghi |
| 2020/0309517 A1 | 10/2020 | D'Agostino et al. |
| 2020/0320739 A1 | 10/2020 | Kunert et al. |
| 2021/0387637 A1 | 12/2021 | Rogers |
| 2022/0234596 A1 | 7/2022 | Jefferies et al. |

FOREIGN PATENT DOCUMENTS

| | | |
|---|---|---|
| CN | 107856649 A | 3/2018 |
| DE | 2948573 | 6/1981 |
| DE | 19857871 C1 | 10/2000 |
| DE | 102009009046 A1 | 10/2009 |
| DE | 102009015207 | 9/2010 |
| EP | 0593066 | 4/1994 |
| EP | 0593067 | 4/1994 |
| EP | 0679865 A1 | 11/1995 |
| EP | 0766064 A2 | 4/1997 |
| EP | 0994329 | 4/2000 |
| EP | 2808082 | 10/2001 |
| EP | 1221584 | 7/2002 |
| EP | 1260832 A1 | 11/2002 |
| EP | 1505363 | 2/2005 |
| EP | 0946857 B1 | 7/2005 |
| EP | 0943890 B1 | 2/2007 |
| EP | 1376051 B1 | 1/2008 |
| EP | 1295087 B1 | 8/2010 |
| EP | 2302318 A1 | 3/2011 |
| EP | 1818748 B1 | 5/2014 |
| EP | 3084348 B1 | 3/2017 |
| EP | 3036516 B1 | 4/2018 |
| EP | 3608687 A1 | 2/2020 |
| EP | 3228976 B1 | 11/2020 |
| JP | 200505389 A | 3/2005 |
| JP | 4530604 B2 | 8/2010 |
| JP | 2019529918 A | 10/2019 |
| KR | 1020070016095 A | 2/2007 |
| KR | 20100017607 A | 2/2010 |
| KR | 100948886 B1 | 3/2010 |
| KR | 101510336 B1 | 4/2015 |
| KR | 1020150105766 A | 9/2015 |
| KR | 20160137313 A | 11/2016 |
| KR | 101729619 B1 | 4/2017 |
| KR | 20190019403 A | 2/2019 |
| WO | 9515479 A1 | 6/1995 |

(56) References Cited

FOREIGN PATENT DOCUMENTS

| WO | 2000071972 | 11/2000 |
| WO | 0231437 A1 | 4/2002 |
| WO | 2008014783 | 2/2008 |
| WO | 2008086773 A1 | 7/2008 |
| WO | 2008130385 A1 | 10/2008 |
| WO | 2010138543 | 12/2010 |
| WO | 2013079395 A1 | 6/2013 |
| WO | 2015092594 A2 | 6/2015 |
| WO | 2017016541 A1 | 2/2017 |
| WO | 2018035040 A1 | 2/2018 |
| WO | 2018067354 A1 | 4/2018 |
| WO | 2018153723 A1 | 8/2018 |
| WO | 2018158073 A1 | 9/2018 |
| WO | 2018167809 A1 | 9/2018 |
| WO | 2018188931 A1 | 10/2018 |
| WO | 2020056303 A1 | 3/2020 |
| WO | 2021005578 A1 | 1/2021 |

OTHER PUBLICATIONS

Dürr Factory Assembly Systems (FAS) materials, Dr. Thomas Tentrup, believed to be dated Sep. 2006, with partial translation of pp. 12-14.

MAHLE Aftermarket Italy S.P.A., TechPRO Digital ADAS, 4 pages, Apr. 2019, Parma, Italy.

Screenshots from https://www.youtube.com/watch?v=7wdgc-RsewQ, uploaded on Jul. 31, 2015 by Dürr.

International Search Report and Written Opinion of the International Searching Authority from corresponding Patent Cooperation Treaty (PCT) Application No. PCT/IB2021/059058, indicated completed on Dec. 22, 2021.

\* cited by examiner

TARGET ALIGNMENT FOR VEHICLE SENSOR CALIBRATION

CROSS REFERENCE TO RELATED APPLICATION

The present application claims priority of U.S. provisional application Ser. No. 63/086,116 filed Oct. 1, 2020, and is a continuation-in-part of U.S. application Ser. No. 16/398,404 filed Apr. 30, 2019, which claims priority of U.S. provisional application Ser. No. 62/664,323 filed Apr. 30, 2018 and claims priority of U.S. provisional application Ser. No. 62/798,268 filed Jan. 29, 2019, and is also a continuation-in-part of U.S. application Ser. No. 16/731,340 filed Dec. 31, 2019, which claims priority of U.S. provisional application Ser. No. 62/786,896 filed Dec. 31, 2018, where U.S. application Ser. No. 16/731,340 is a continuation-in-part of U.S. application Ser. No. 16/398,404 filed Apr. 30, 2019, which claims priority of U.S. provisional application Ser. No. 62/664,323 filed Apr. 30, 2018 and claims priority of U.S. provisional application Ser. No. 62/798,268 filed Jan. 29, 2019, which are all hereby incorporated herein by reference in their entireties.

BACKGROUND AND FIELD OF THE INVENTION

The present invention is directed to a vehicle alignment/calibration method and system, and in particular to a method and system for aligning a vehicle and sensors of a vehicle to one or more autonomously positioned alignment/calibration targets.

The use of radar, imaging systems, and other sensors, such as LIDAR, ultrasonic, and infrared (IR) sensors, to determine range, velocity, and angle (elevation or azimuth) of objects in an environment are important in a number of automotive safety systems, such as an Advanced Driver Assistance System (ADAS) for a vehicle. A conventional ADAS system will utilize one or more sensors. While these sensors are aligned and/or calibrated by the manufacturer on the assembly line (or at another time or another facility), the sensors may need realignment or recalibration periodically, such as due to the effects of wear and tear, or misalignment due to driving conditions or through mishap, such as an accident. Furthermore, such an ADAS system may comprise one or more subsystems, e.g., adaptive cruise control (ACC), lane departure warning (LDW), parking assistance, and/or a rear-view camera, each of which may periodically require individual realignment or recalibration.

SUMMARY OF THE INVENTION

The present invention provides a method and system for aligning and/or calibrating a vehicle equipped sensor by aligning the vehicle and thereby the vehicle equipped sensor with one or more calibration targets positioned by a target. In positioning the one or more calibration targets, a target adjustment stand positions the appropriate targets according to a known reference position. The vehicle is also positioned and centered on a vehicle support stand with respect to this known reference position. With the vehicle and calibration target positioned and centered with respect to the known reference position, the vehicle sensor is calibrated, such as via an original equipment manufacturer ("OEM") calibration process. In still other embodiments, a rear thrust angle for the vehicle may be determined, which may be used to adjust the position of the positioned targets.

In accordance with an aspect of the present invention, a system for aligning a target to an equipped vehicle for calibration of a sensor on the equipped vehicle includes a vehicle support stand upon which an equipped vehicle is stationarily disposed in an established known position for calibration of a sensor on the equipped vehicle, and a target adjustment stand including a base frame, a target mount moveably mounted on the base frame with the target mount configured to support a target. The target adjustment frame includes a plurality of actuators configured to selectively move the target mount relative to the base frame, wherein the base frame is longitudinally moveable along a track. The target adjustment stand is configured to position the target into a calibration position relative to the sensor on the equipped vehicle by longitudinal movement of the base frame relative to the vehicle support stand and by movement of the target mount based on the established known position of the equipped vehicle on the vehicle support stand whereby the sensor is able to be calibrated using the target.

According to a particular embodiment, the track includes rails along which the base frame is moveable, either manually or automatically. Still further, the vehicle support stand comprises a plurality of locator arms that are extendable and retractable and configured to press against tire and wheel assemblies of the equipped vehicle to orient the equipped vehicle on the vehicle support stand. The locator arms may comprise sets of forward opposed arms and rearward opposed arms, where the forward opposed arms are configured to extend equally in opposite directions from each other and the rearward opposed arms are configured to extend equally in opposite directions from each other. The system may further include one or more distance sensors that are operable to determine the distance between the vehicle support stand and the target adjustment stand. In particular, the distance sensors may be used to determine the distance relative to a rotatable base member on the target adjustment stand for use in adjusting both the lateral distance between the vehicle and the target, as well as the rotational orientation of the target on the target adjustment stand.

The vehicle support stand may utilize moveable forward and rearward tire supports upon which the opposed sets of tires of the equipped vehicle are disposed, such as forward and rearward rollers. In a particular embodiment, the forward tire supports each comprise two sets of rollers that are angled together in a V-shaped configuration for locating the equipped vehicle.

According to a further aspect of the present invention, the vehicle support stand comprises a forward centering device disposed beneath the equipped vehicle when the equipped vehicle is on the vehicle support stand, with the forward centering device having a pair of locator arms configured to extend outwardly synchronously to engage an inner side of the forward tire and wheel assemblies of the equipped vehicle. The vehicle support stand may further include a rearward centering device disposed beneath the equipped vehicle when the equipped vehicle when on the vehicle support stand, with the rearward centering device having a pair of locator arms configured to extend outwardly synchronously to engage an inner side of the rearward tire and wheel assemblies of the equipped vehicle.

The system further includes a controller configured to selectively actuate the actuators of the target adjustment stand to position the target, where the actuators are operable to move the target mount longitudinally and laterally with respect to a longitudinal axis of the vehicle when positioned in front of the target adjustment stand, vertically, and rotationally about a vertical axis.

In a specific embodiment, the target adjustment frame includes a base member movably mounted to the base frame and a tower joined to the base member with the target mount supported by the tower, and with the actuators including a base member actuator to selectively move the base member horizontally relative to the base frame and a tower actuator to selectively rotate the tower relative to the base member, with the controller configured to actuate the actuators to position the target based on the orientation of the vehicle on the vehicle support stand. In particular, the base member is moveable longitudinally by the base member actuator relative to the longitudinal axis of the vehicle positioned in front of the target adjustment stand, and the tower is rotatable about a vertical axis by the tower actuator. Still further, the target adjustment frame includes a target mount rail disposed on the tower, with a first target mount actuator being operable to move the target mount laterally along the target mount rail and a second target mount actuator being operable to adjust the vertical orientation of the target mount.

In accordance with a further aspect of the present invention, a method for aligning a target to an equipped vehicle for calibration of a sensor on the equipped vehicle includes maneuvering an equipped vehicle onto a vehicle support stand, where the equipped vehicle includes a sensor and is stationarily disposed on the vehicle support stand, and moving a target held by a target adjustment stand into a calibration position for calibration of the sensor based on an established known position of the equipped vehicle on the vehicle support stand. The target adjustment stand is moveable longitudinally along a track relative to the longitudinal axis of the equipped vehicle on the vehicle support stand, and the target adjustment stand includes a base frame, a target mount configured to support a target moveably mounted on the base frame, and with the target adjustment stand further including a multiple actuators configured to selectively move the target mount relative to the base frame. The method may further include calibrating the sensor of the equipped vehicle once the target has been positioned. In particular, the method may involve the use of any of the discussed vehicle support stand and/or target support stands discussed herein.

Still further, the systems and methods may further include the use of non-contact wheel alignment sensors configured to be disposed on opposite sides of the vehicle for use in determining the orientation of the vehicle on the vehicle support stand for positioning of the target.

The present invention provides a system and method for quickly and accurately positioning a calibration target relative to a sensor of a vehicle and calibrating the sensor, such as in accordance with OEM specifications. The accurate positioning and calibration of the sensor thus aids in optimizing the performance of the sensor to in turn enable the sensor to perform its ADAS functions. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
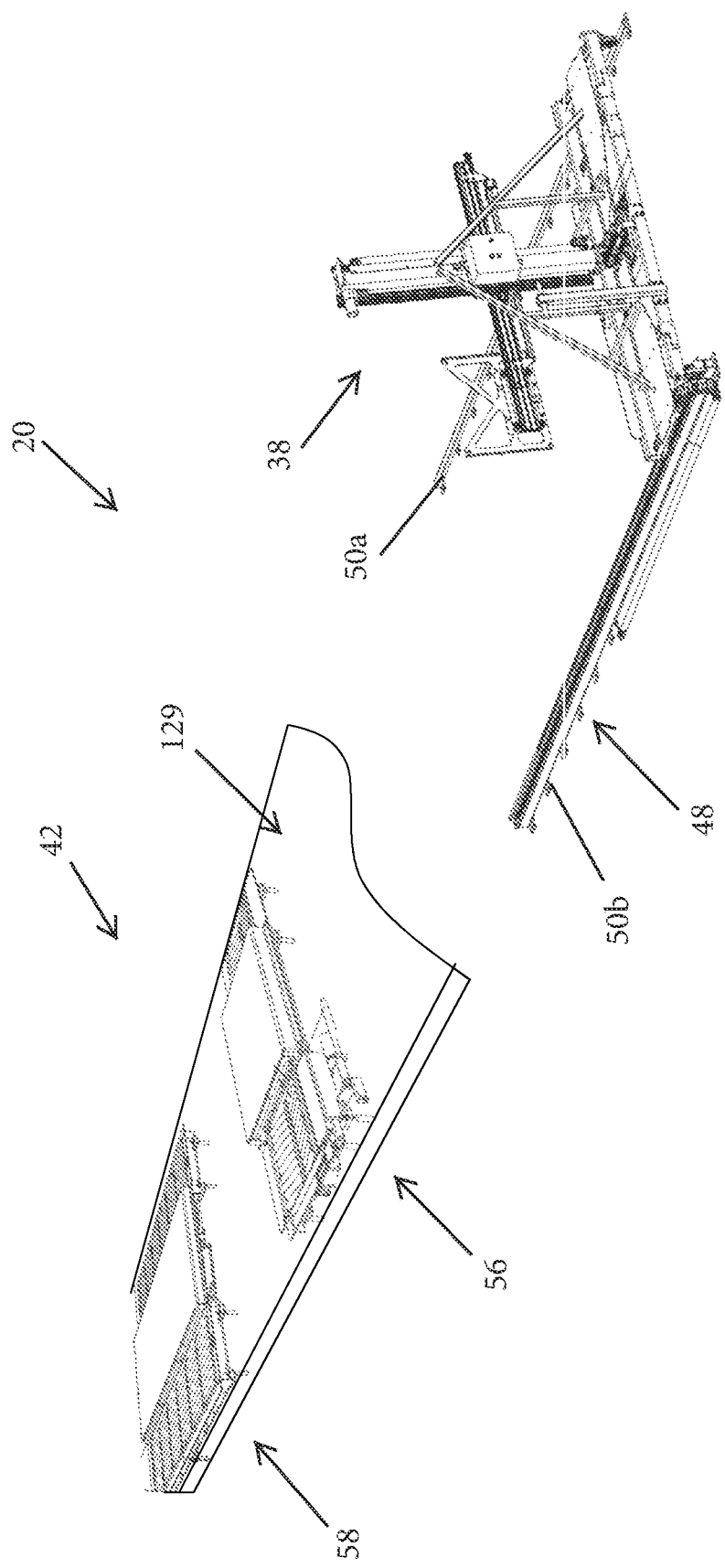
FIG. 1 is a perspective view of a target alignment system for calibration of a sensor of a vehicle in accordance with the present invention.

FIG. 1 illustrates an exemplary arrangement of a target alignment and ADAS sensor calibration system 20 for use in calibrating one or more sensors 32 of a vehicle 34 (FIG. 2) with a target or target panel 36 (FIG. 10) held by a moveable target adjustment stand or frame 38 positioned in front of the vehicle 34. As discussed in detail below, the target 36 is positioned with respect to the vehicle 34 for calibrating/aligning one or more sensors 32 of the vehicle 34, where the target is adjustably moved via the target adjustment stand 38 into a known orientation or calibration position with respect to the vehicle 34, including with respect to sensor 32 of the vehicle. For example, upon orienting vehicle 34 into a known position, which may include determining the orientation of vehicle 34, target adjustment stand 38 may move target 36 to align target 36 to one or more sensors 32 of vehicle 34. As discussed herein, the sensors to be calibrated are part of one or more subsystems of an exemplary Advanced Driver Assistance System (ADAS) of the vehicle. Sensors 32 may thus be radar sensors for adaptive cruise control ("ACC"), imaging systems such as camera sensors for lane departure warning ("LDW") and other ADAS camera sensors disposed about vehicle, as well as other sensors, such as LIDAR, ultrasonic, and infrared ("IR") sensors of an ADAS system, including sensors mounted inside the vehicle, such as forward facing cameras, or exterior mounted sensors, with the targets 36 supported by target adjustment stand 38 constructed for calibration of such sensors, including grids, patterns, trihedrals, and the like. Upon aligning the target 36 with the sensor 32 of the vehicle 34, a calibration routine is performed whereby the sensor is calibrated or aligned using the target 36. As used herein, references to calibration of the sensor encompass alignment of the sensor with the calibration target.

With further reference to FIGS. 1, 2, 10 and 11, system 20 includes a computer system or controller 40, a vehicle support stand 42 upon which vehicle 34 is held stationary whereby vehicle 34 is longitudinally oriented with target adjustment stand 38. As understood from FIGS. 6-10 target adjustment stand 38 includes a moveable base 46, where base 46 is configured to move longitudinally along a track 48 relative to vehicle 34, where in the illustrated embodiment the track is defined by rails 50*a,* 50*b,* whereby base 46 is moveable towards and away from vehicle 34 either manually or automatically, such as via one or more electric motors that may be provided control signals via controller 40 or controller 144 on target adjustment stand 38. The electric motor may be provided on the target adjustment stand 38, or may be located elsewhere such as, for example, adjacent rail 50*b* that includes a chain, cable or other drive mechanism for moving target adjustment stand 38 there along. The location of target adjustment stand 38 along the track 48 defined by rails 50*a,* 50*b* may alternatively or additionally be manually set, such as via a peg and hole system, such as with rail 50*a* and/or rail 50*b* including multiple holes within which a peg or lock mechanism 142 (FIG. 8) of target adjustment stand 38 may be inserted.

In the illustrated embodiment, the track 48 defined by rails 50*a,* 50*b* is configured to enable base 46 of target stand 38 to be moved from between approximately 1 meter to 20 meters from vehicle 34 when vehicle 34 is disposed on stand 42, but preferably is moveable between approximately 1 meter to approximately between 7 to 10 meters. As shown, the track 48 is positioned in front of or forward of vehicle 34. Track 48 is centrally aligned in a known orientation or position with respect to support stand 42 whereby the longitudinal axis of vehicle 34 on support stand 42 is aligned with the longitudinal axis of track 48. Base 46 of target stand 38 may conventionally comprise one or more load cells configured to detect and/or measure impact force to determine whether or not the target stand 38 has come into contact with something while manipulating a target 36 or when moving along the track 48. For example, the target stand 38 may be configured to stop motion should the target stand 38 come into contact with an object or person. Vehicle 34 may be maneuvered onto and off of support stand 42, including over track 48 when track 48 is recessed into a floor surface, such as by driving vehicle 34. For example, vehicle 34 may be driven onto support stand 42 and, upon completion of calibration of a given sensor 32, vehicle 34 may be driven in the same direction off of support stand 42, with vehicle 34 being driven over track 48. Alternatively, vehicle 34 may be driven in an opposite direction off of support stand 42 upon calibration of sensor 32. For example, as understood with regard to the orientation of vehicle 34 in FIG. 1, vehicle may be driven forward onto support stand 42 and then driven in reverse off of support stand 42 upon calibration of sensor 32. Alternatively, a vehicle 34 may be maneuvered onto stand 42 in a reversed orientation, such as for calibration of a rearward facing sensor.

As discussed in more detail below, target stand 38 includes a moveable target mount 44 for use in holding or retaining the required target 36, where multiple targets may be disposed in a holder (not shown) adjacent track 48. For example, the holder may include different types of targets for different types of sensors, as well as for different types of vehicle makes and models, whereby upon selecting the desired target for a particular vehicle under test, target stand 38 will be used to position the target into the appropriate position for calibrating of the particular ADAS sensor that is to be calibrated. As noted, various targets may be held by target mount 44, including panels with grids, patterns, trihedrals, or other known targets for use in calibrating sensors. This includes, for example, targets for vision cameras, night vision systems, laser scanner targets, ultrasonic sensors, and the like, including for aligning or calibrating ACC (adaptive cruise control) sensors, LDW (lane departure warning) sensors, and night vision sensors of the vehicle. In an aspect of the present invention, a plurality of different target frames may be individually configured for different sensors, e.g., ACC, LDW, and night vision sensors. An exemplary pattern or grid is disclosed on target 36 in connection with FIGS. 10 and 11. It should be appreciated, however, that as discussed herein alternatively configured targets may be employed within the scope of the present invention, including alternative patterns, grids, and constructions of targets. Alternatively target 36 may be an electronic digital display device configured to be able to display or show on a screen different patterns, grids or the like depending on vehicle make and model and sensor being calibrated, where controller 40 is operable to cause the correct target pattern to be displayed based on the vehicle 34 and sensor 32 being calibrated.

Figure 2:
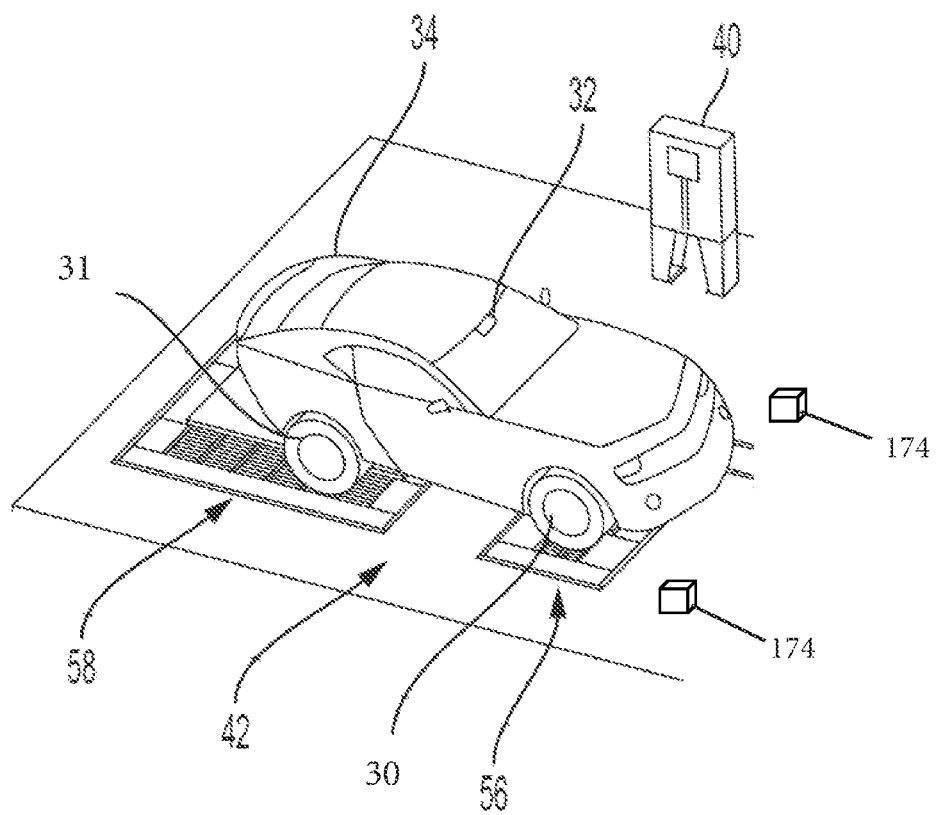
FIG. 2 is a close-up perspective view of a portion of the system of FIG. 1 shown with a vehicle positioned on a vehicle centering system of the target alignment system.

As understood from FIGS. 1 and 2, vehicle support stand 42 includes a forward wheel support and centering assembly 56 and a rearward wheel support and centering assembly 58 upon which vehicle 34 is disposed for positioning or orienting vehicle 34. In the orientation of FIGS. 1 and 2, the front wheel assemblies 30 of vehicle 34 are located on forward wheel support and centering assembly 56 and the rear wheel assemblies 31 of vehicle 34 are located on rearward wheel support and centering assembly 58. As discussed in more detail below, assemblies 56, 58 enable lateral movement of vehicle 34 for purposes of positioning vehicle 34. In addition, forward wheel support and centering assembly 56 also provides longitudinal retention of vehicle 34. It should be appreciated that if desired a vehicle may be rearwardly oriented toward target positioning system 44, such as for calibration of one or more rearwardly oriented vehicle sensors, in which case the rear wheel assemblies 31 of vehicle 34 would be disposed on the forward wheel support assembly 56.

With reference to FIGS. 3-6, forward wheel support and centering assembly 56 includes oppositely disposed tire supports 64*a,* 64*b* positioned on opposite sides of forward vehicle centering device 66, where tire supports 64*a,* 64*b* are configured to receive the tires of a pair of opposed tire and wheel assemblies of vehicle 34, such as the front wheel assemblies 30 as shown in FIG. 1. Tire supports 64*a,* 64*b* are substantially identical, but mirror versions of each other. As such, the discussion herein focuses on tire support 64*a,* but it should be appreciated that the discussion applies to tire support 64*b.*

Figure 4:
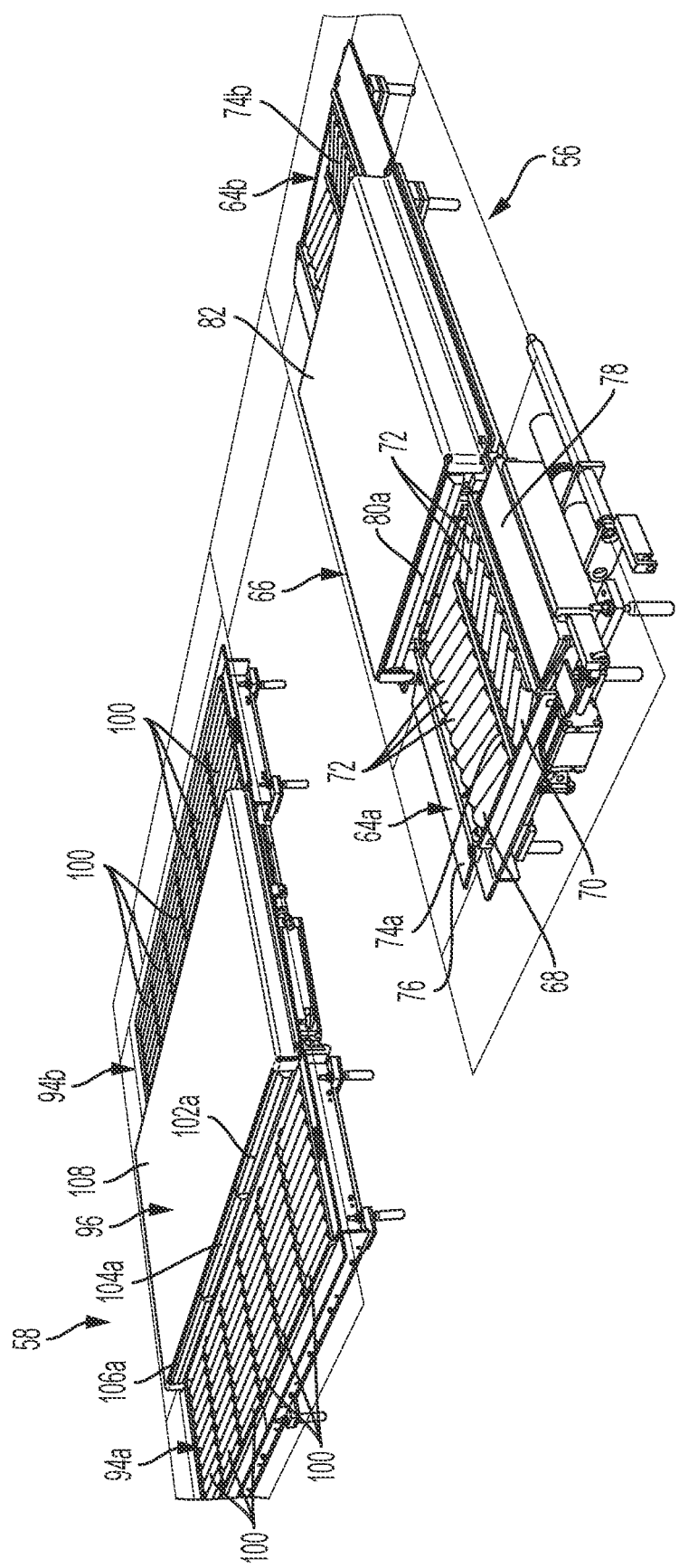
FIG. 4 is a perspective view of the vehicle centering system of FIG. 3.
Figure 5:
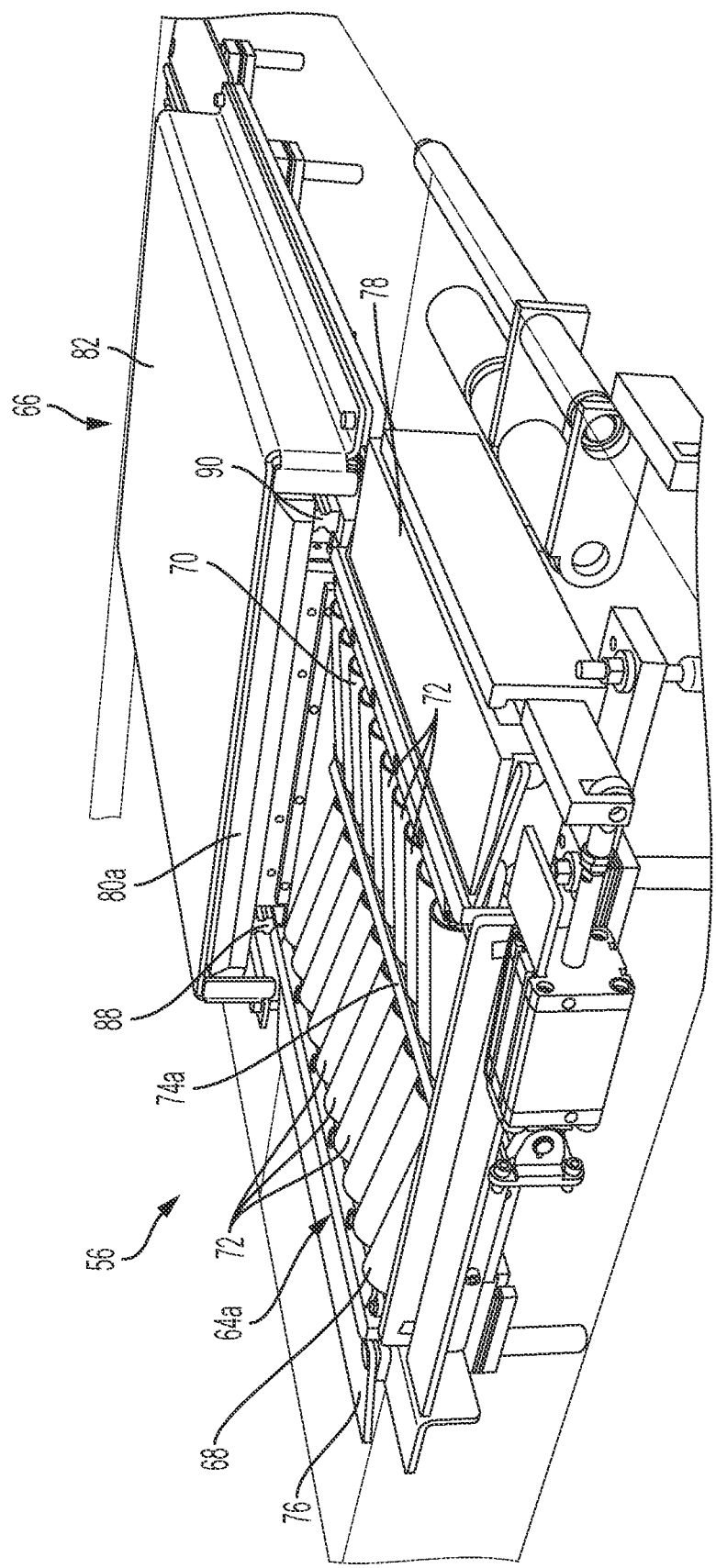
FIG. 5 is a side perspective view of the forward wheel assembly supports of the vehicle centering system of FIG. 3.
Figure 6:
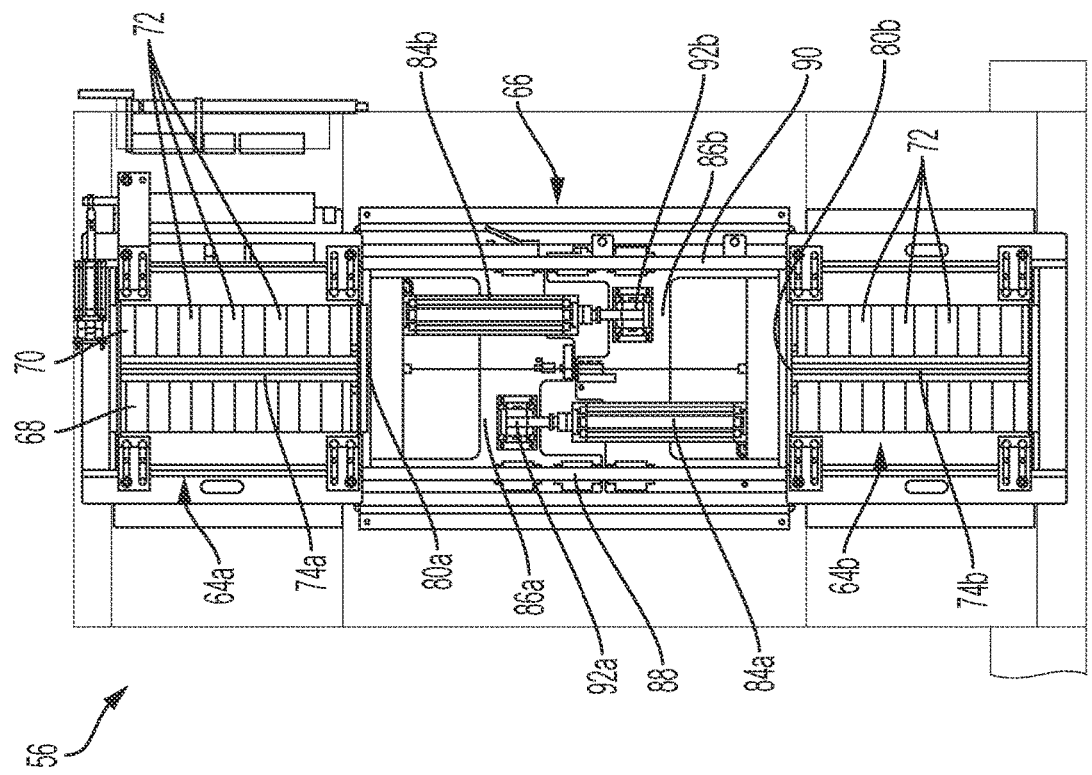
FIG. 6 is a bottom plan view of the forward wheel assembly supports of the vehicle centering system of FIG. 3.

Tire support 64*a* includes two sets 68, 70 of rollers 72 with the rollers 72 arranged with their axes of rotation parallel with the longitudinal axis of the vehicle 34 when disposed on support stand 42. As such, a vehicle having a pair of front tires disposed on rollers 72 will be moveable laterally with respect to its longitudinal axis via the rollers 72. As best shown in FIGS. 4 and 5, the sets 68, 70 of rollers 72 are inwardly angled with respect to each other. That is, the adjacently located ends of rollers 72 of each set 68, 70 are disposed vertically lower than the outwardly located ends in a V-shaped configuration. As such, the wheel assemblies 30 of vehicle 34 will be naturally oriented to rest in a fixed longitudinal position when located on tire supports 64*a,* 64*b* along the axes 74*a,* 74*b* defined by the adjacent mounting ends of rollers 72. It should be appreciated that the axes 74*a,* 74*b* are arranged so as to be aligned with each other and perpendicular to track 48 and the longitudinal axis of vehicle 34 when positioned on stand 42. Tire support 64*a* additionally includes ramps 76, 78 for supporting a vehicle tire as the vehicle 34 is driven onto and off of support stand 42.

Vehicle 34 is centered or positioned on support stand 42 in part via vehicle centering device 66, which is operable to center or position the forward portion of vehicle 34. Vehicle centering device 66 includes a pair of opposed synchronized arms or bumpers 80a, 80b that are configured to extend outwardly from housing 82 to contact the inner sidewalls of the tires disposed on tire supports 64a, 64b. Arms 80a, 80b in particular are synchronized to move outwardly from housing 82 equally and simultaneously in opposed directions via a pair of actuators 84a, 84b (FIG. 6) that are linked together and operated by controller 40. As understood from FIGS. 5 and 6, arm 84a is affixed to or part of plate 86a and arm 84b is affixed to or part of plate 86b, with plates 86a, 86b being slidably mounted on rails or slides 88, 90. Extendable end 92a of actuator 84a is mounted to plate 86a whereby extension of end 92a causes arm 84a to extend outwardly. Likewise, extendable end 92b of actuator 84b is mounted to plate 86b whereby extension of end 92b causes arm 84b to extend outwardly. The arms 80a, 80b are likewise retractable via retraction of ends 92a, 92b of actuators 84a, 84b. It should thus be appreciated that vehicle centering device 66 is operable to center the forward portion of vehicle 34 on vehicle support stand 42 by way of the rollers 72 allowing the vehicle to be laterally moved via equal and opposite extension of arms 80a, 80b whereby arms 80a, 80b contact and push against the inner sidewall of the tires.

Figure 3:
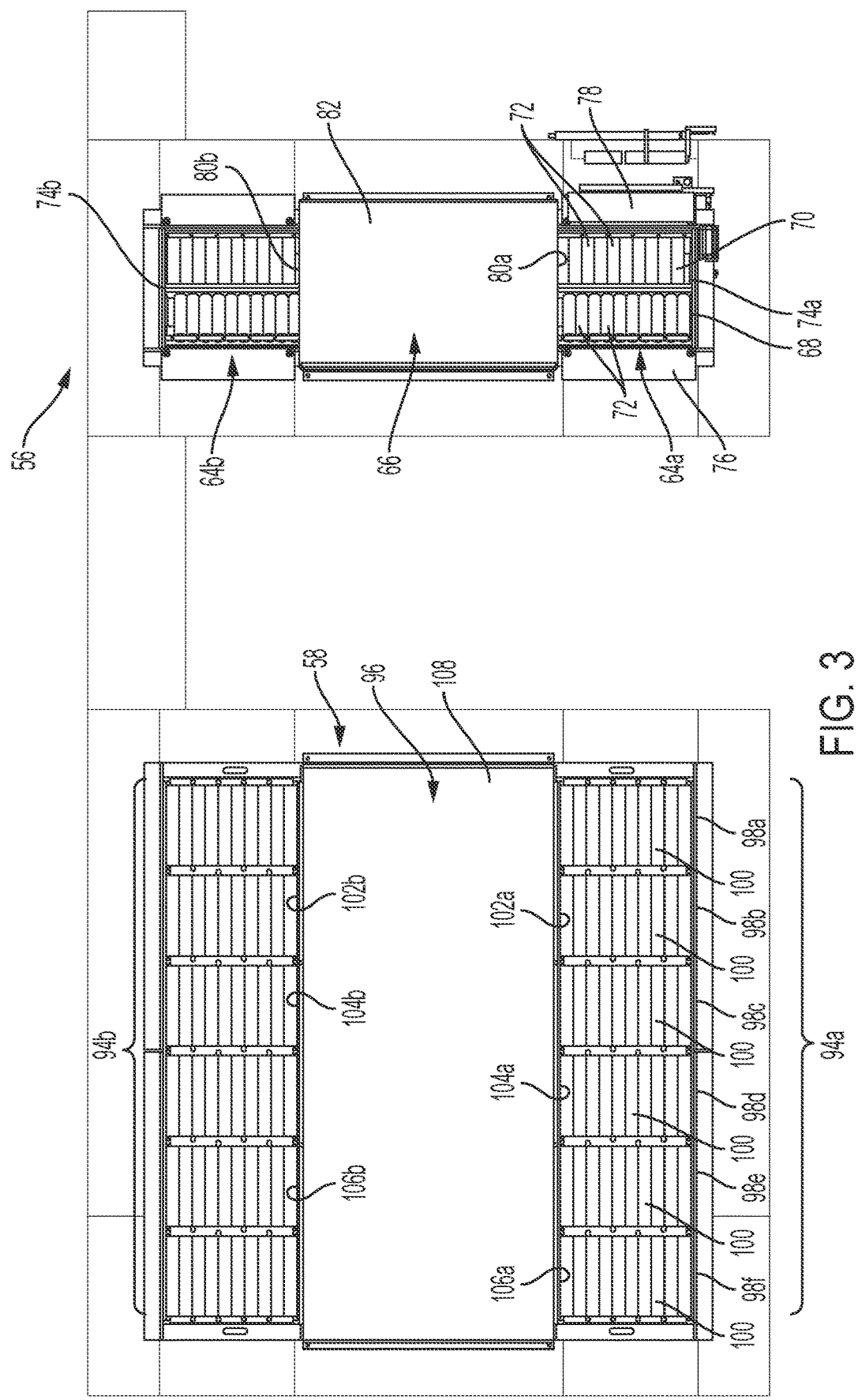
FIG. 3 is a top plan view of the vehicle centering system of the target alignment system of FIG. 1.
Figure 7:
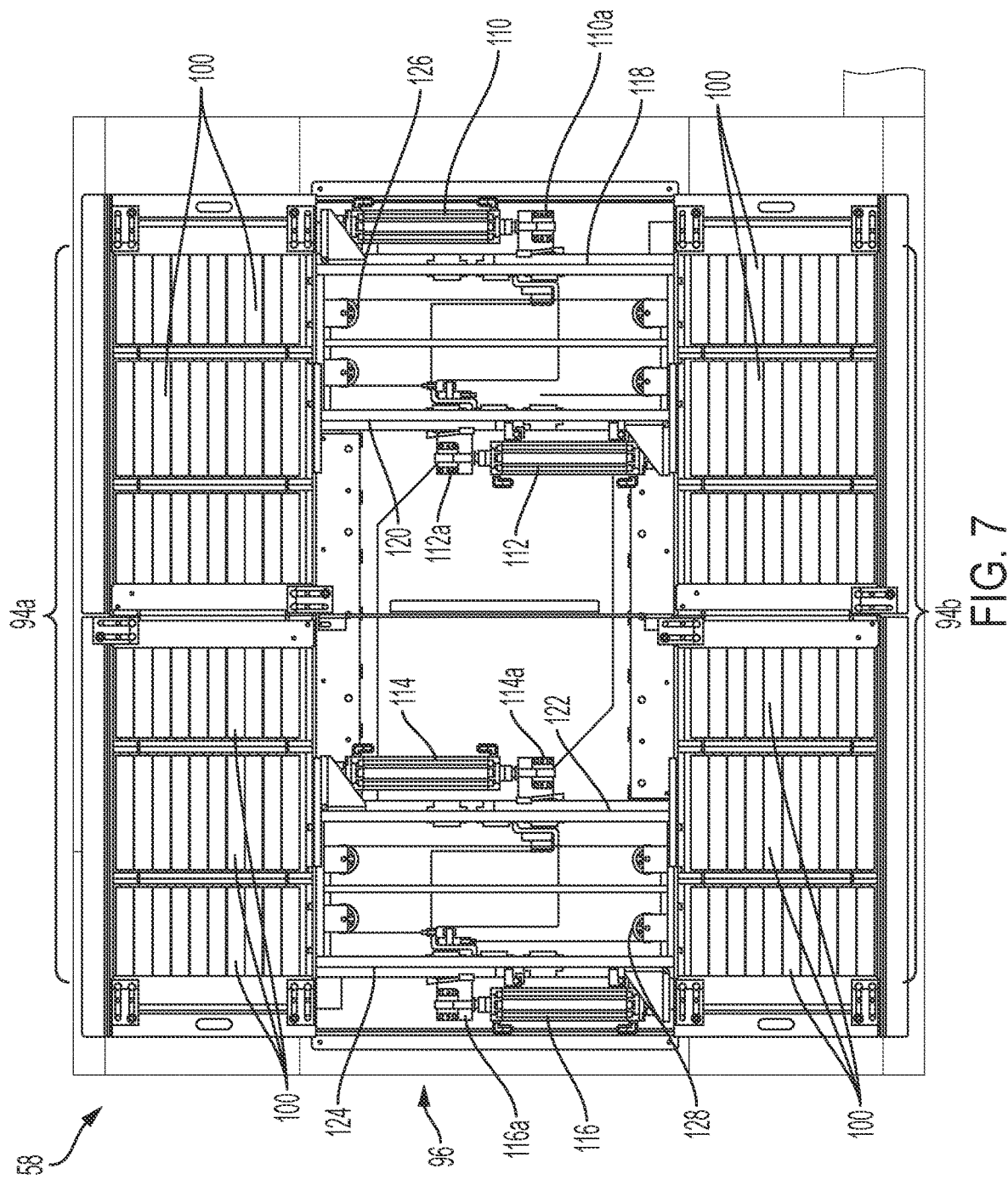
FIG. 7 is a bottom plan view of the rearward wheel assembly supports of the vehicle centering system of FIG. 3.

With reference to FIGS. 3, 4 and 7, rearward wheel support and centering assembly 58 includes oppositely disposed tire supports 94a, 94b positioned on opposite sides of rearward vehicle centering device 96, where tire supports 94a, 94b are configured to receive the tires of a pair of opposed tire and wheel assemblies of vehicle 34, such as the rear wheel assemblies 31 as shown in FIG. 1. Tire supports 94a, 94b are substantially identical, but mirror versions of each other. As such, the discussion herein focuses on tire support 94a, but it should be appreciated that the discussion applies to tire support 94b.

Tire support 94a includes six sets 98a-98f of rollers 100 in the illustrated embodiment, with the rollers 100 arranged with their axes of rotation parallel with the longitudinal axis of the vehicle 34 when disposed on support stand 42. As such, a vehicle having a pair of rear tires disposed on rollers 100 will be moveable laterally with respect to its longitudinal axis via the rollers 100. In contrast to forward wheel support and centering assembly 56, the rollers 100 of the rearward wheel support and centering assembly 58 all lie in the same plane. The multiple sets 98a-98f of rollers 100 enable vehicles with differing wheelbases to be used on support stand 42. That is, for example, when the opposed forward wheel assemblies of vehicles are retained by tire supports 64a, 64b, the opposed rearward wheel assemblies of the vehicle can still be positioned on tire supports 94a, 94b even with differing wheelbase lengths of the vehicles. Ramps may also be provided at the entrance and exists to tire supports 94a, 94b to aid in the driving of vehicles thereon and off.

Vehicle 34 is also centered or positioned on support stand 42 in part via rearward vehicle centering device 96, which operates in generally like manner to vehicle centering device 66 to center or position the rearward portion of vehicle 34. Rearward vehicle centering device 96 includes multiple pairs of opposed and synchronized locator arms or bumpers 102a, 102b, 104a, 104b and 106a, 106b that are configured to extend outwardly from housing 108 to contact the inner sidewalls of the tires disposed on tire supports 94a, 94b. In particular, each set of opposed arms of centering device 96 are synchronized to move outwardly from housing 108 equally and simultaneously in opposed directions via actuators 110, 112, 114, 116 (FIG. 7) that are linked together and operated by controller 40. Arms 102a, 102b, 104a, 104b, 106a and 106b are slidably mounted for movement on rails or slides 118, 120, 122 and 124, whereby moveable ends 110a, 112a, 114a, 116a of actuators 110, 112, 114, 116 are able to extend and retract arms 102a, 102b, 104a, 104b, 106a and 106b relative to housing 108, including via the pulley linkages 126, 128. It should thus be appreciated that vehicle centering device 96 is operable to center the rearward portion of vehicle 34 on vehicle support stand 42 by way of the rollers 100 allowing the vehicle to be laterally moved via equal and opposite extension of arms 102a, 102b, 104a, 104b, 106a and 106b whereby the arms contact and push against the inner sidewall of the tires.

Although vehicle support stand 42 is shown in the illustrated embodiment to position, center and/or orient the vehicle 34 by arms pushing against the inner sidewall of the tires, it should be readily appreciated that an alternatively constructed centering system could be constructed in which arms or bumpers press against the outer sidewall of the tires by pushing inwardly an equal and opposite amount from the outside of the vehicle, such as inwardly extending locator arms that extend to push against the outer sidewalls of the tires. Moreover, although tire supports 64a, 64b and 94a, 94b of system 20 are disclosed as utilizing rollers 72, 100 for lateral adjustment of vehicle 34 on support stand 42, it should be appreciated that alternative tire supports may be employed within the scope of the present invention. For example, tire supports may be constructed as floating fixtures, such as conventional floating or float plates that is recessed into the vehicle support stand and is configured to freely float the vehicle wheel assembly on a plate in multiple degrees of freedom, including laterally with respect to the longitudinal axis of the vehicle.

With vehicle 34 centered or oriented on stand 42 via the vehicle centering devices 66, 96, a desired target 36 affixed to target mount 44 is manipulated by target adjustment stand 38 to position the target 36 for use in aligning or calibrating the one or more sensors 32 of the vehicle 34. That is, the target 36 is oriented with respect to the vehicle 36 such that the appropriate target is in position for performing a desired alignment or calibration of the sensor of that particular vehicle.

The location at which target 36 is positioned by target adjustment stand 38 may be programmed into controller 40, such as based on the vehicle make and model and particular sensor that is to be aligned/calibrated. For example, with vehicle 34 centered on stand 42, target adjustment stand 38 may be used to locate target 36 to a particular position based on a reference point corresponding to the required location for the target 36 based on the position of the vehicle 34. The reference point may thus be defined as a relationship between the target 36 and the centering system 66, 96 of the stand 42. Such a reference point or spatial relationship allows for the accurate placement of the calibration/alignment targets positioned by the target adjustment stand 38. In a particular embodiment, as discussed in more detail below, a master positioned on stand 42 may be used in determining reference points for a vehicle, such as for particular sensors of a given make and model of vehicle.

As understood from FIG. 1, vehicle support stand 42 and target adjustment stand 38 are disposed at the same vertical height whereby a vehicle may be driven onto and off of system 20. For example, stand 42 and track 48 may be arranged within a pit or with entry and exit ramps 43, whereby a vehicle 34 may be driven onto stand 42 for the performance of an alignment and calibration routine, with the vehicle 34 then driven in the same direction to exit from system 20. Target adjustment stand 38 may be moved longitudinally rearwardly, with vehicle 34 then driven off to the left or right. The support stand 42 and target positioning system thus define or include a stationary support surface 129 upon and over which vehicle 34 is able to be moved or driven, with the wheel assembly supports 56, 58 and track 48 being disposed in or at support surface 129.

Calibration of sensors 32 on vehicle 34 requires positioning of targets 36 relative to sensors 32 in order to perform a calibration operation, such as in accordance with OEM specifications. Accordingly, upon vehicle 34 being centered or oriented on stand 42 via the vehicle centering devices 66, 96, the position of target adjustment frame 38 may be adjusted, as discussed below.

As noted above and, for example, shown in FIG. 1, target adjustment stand 38 is positioned on rails 50a, 50b for longitudinal movement relative to vehicle stand 42 and vehicle 34, where target adjustment stand 38 is in a known orientation relative to vehicle stand 42 whereby targets 36 may be positioned relative to vehicle 34, and thereby sensors 34, with vehicle 34 in a known, established position on support stand 42. In particular, base frame 46 of target stand 38 is in a known orientation relative to support stand 42, whereby based on establishing the orientation or position of vehicle 34 on support stand 42, the orientation of vehicle 34 to target stand 38 is thus determined or established.

Figure 8:
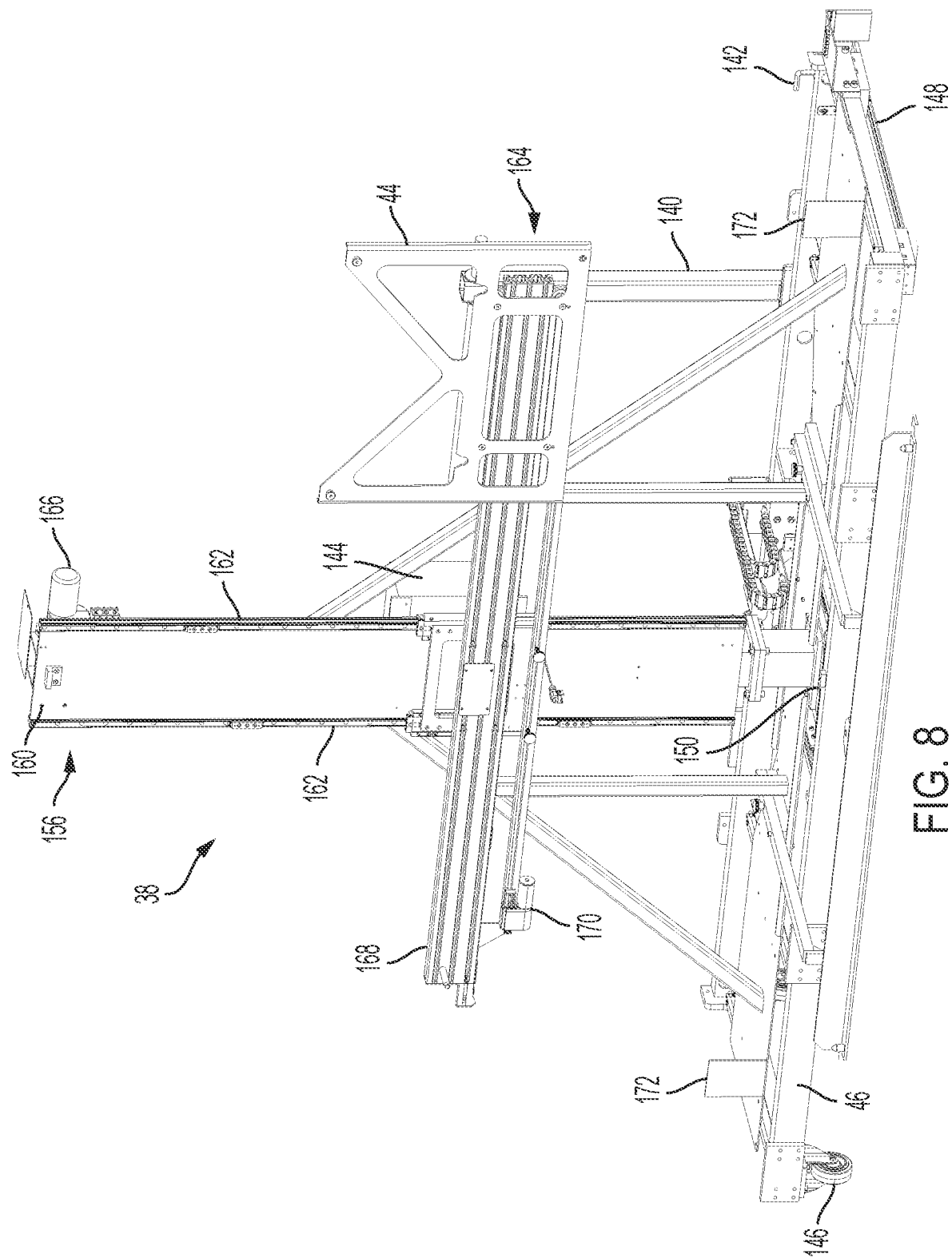
FIG. 8 is a front perspective view of a target adjustment frame or stand of the system of FIG. 1 in accordance with aspects of the present invention and shown separate from the system of FIG. 1.
Figure 9:
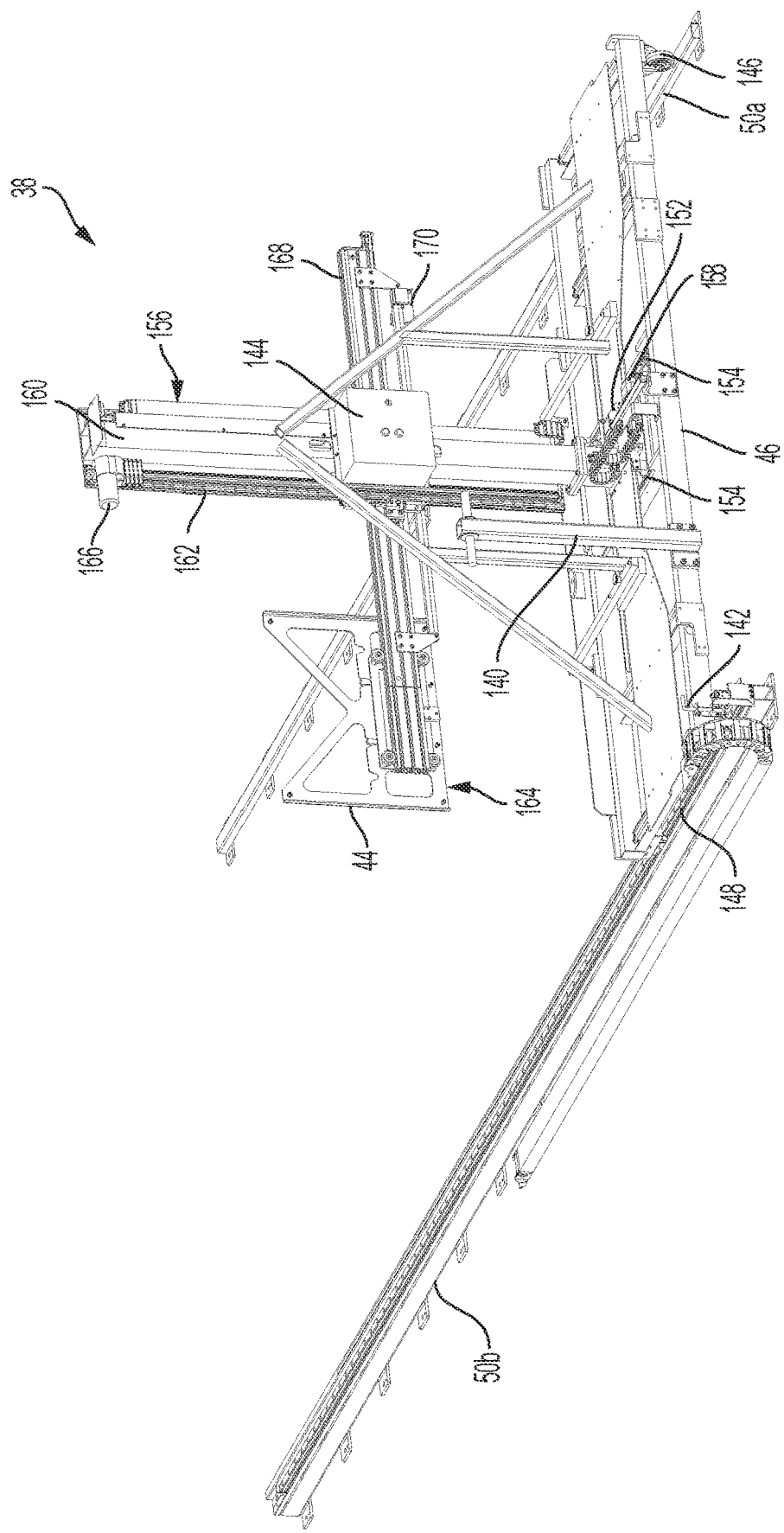
FIG. 9 is a rear perspective view of the target adjustment stand of FIG. 6.

A detailed description of target adjustment frame 38 will now be provided with reference to FIGS. 8 and 9, vehicle target stand 38 is adjustable longitudinally along rails 50a, 50b to position target stand 38, and hence a target 36 mounted thereto, relative to vehicle 34 on support stand 42. In particular the base or base frame 46 of target stand 38 is mounted for movement along rails 50a, 50b. Target stand 38 may be manually moveable along rails 50a, 50b via an operator pushing on handle 140, and/or automatically adjustable along rails 50a, 50b, such as via powered wheels driven by motor 52 or by one or more rail actuators, chain drives, pulley systems or the like. Target stand 38 may additionally be securable to rails 50a, 50b, such as by a manual lock 142, so as to retain base frame 46 in a rough initial position, such as upon manual movement by an operator based on directions provided via controller 40 and/or 144. The positioning of target stand 38 along rails 50a, 50b may either be an accurate or sufficiently accurate longitudinal positioning of target 36 relative to the vehicle 34 for purposes of calibrating sensor 32, or the positioning of target stand 38 along rails 50a, 50b may be a first, initial or gross orientation of target stand 38, and in particular base frame 46, relative to vehicle 34 and sensor 32, with target adjustment stand 38 configured to provide still further positioning adjustment of target 36, as discussed below.

As discussed in more detail below, in order to precisely position a target 36, target adjustment stand 38 is additionally moveable longitudinally in a more precise or fine orientation, as well as laterally with respect to the vehicle 34, and vertically, as well as rotationally about the vertical axis. In the illustrated embodiment target adjustment stand 38 is substantially similar to the target frame disclosed in co-pending U.S. patent application Ser. No. 16/398,404, U.S. Pub. No. 2019/0331482A1, which is incorporated herein by reference in its entirety, including with respect to the construction, operation and use of the target frame, but with a difference being the omission of imager housings disclosed in U.S. patent application Ser. No. 16/398,404.

As previously noted target adjustment stand or frame 38 movably supports target 36 and includes controller 144. In the illustrated embodiment, base frame 46 of target adjustment stand 38 is generally rectangular with various frame members and includes wheels 146 for riding on rail 50a and includes a linear slide 148 for riding on rail 50b, with wheels 146 and slide 148 mounted to base frame 46. Alternatively, however, base frame 46 need not include wheels 146 and/or slide 148 such as, for example, in embodiments in which base frame 46 is movable along rails 50a, 50b by a rail actuator. Rails 50a, 50b may be set during installation or adjustable to be level, and/or the sliding connection of base frame 46 with rails 50a, 50b may be adjustable for controlling of level movement, with rails 50a, 50b being in a fixed arrangement relative to vehicle support stand 42 such that the orientation or position of base frame 46 relative to vehicle support stand 42 is known.

Target adjustment stand 38 further includes a base member 150 that is moveable forwards and backwards via an actuator 152 along an X-axis, where base member 150 is mounted for sliding movement in rails 154 of base frame 46 and the X-axis is thus parallel to rails 154 for movement longitudinally relative to vehicle 34 when in the orientation of FIG. 2. A tower assembly 156 is rotatably mounted to base member 150 via a bearing (not shown). The pivoting or rotatable mounting on base member 150 enables tower assembly 156 to be rotated about the vertical or Z-axis by way of actuator 158, as well as translated or moved longitudinally by actuator 152 via movement of base member 150.

Tower assembly 156 in turn includes an upright frame member configured as a vertically oriented tower 160 with vertically oriented rails 162, with a target support assembly 164 being mounted to rails 162 whereby the assembly 164 is moveable up and down in the vertical or Z-axis, where assembly 164 is moveable by way of actuator 166. Target support assembly 164 is mounted to rails 162 for vertical movement, with the target mount 44 in turn being mounted to horizontal rail 168. Target mount 44 is configured to hold target 36 and is horizontally moveable along rail 168 by way of actuator 170, with target mount 44 including various pegs and/or cutouts for supporting targets 36 when targets are selectively removabley hung on or attached to mount 44.

Actuators 152, 158, 166 and 170 are operably connected, such as by control wires, with controller 144 whereby controller 144 is able to selectively activate the actuators to move their associated components of target adjustment stand 38. In addition, as noted above, one or more rail actuators may be employed to move the entirety of target adjustment stand 38 along rails 50a, 50b by translating movement of base frame 46 on rails 50a, 50b. It should be appreciated that various constructions or types of actuators may be used, including for actuators 152, 158, 166 and 170 for movement of the various components of target adjustment stand 38, as well as for rail actuators used to translate base frame 46 on rails 50a, 50b. In the illustrated embodiment, actuators 152, 158, 166 and 170 are constructed as electrical linear actuators. Alternatively, however, the actuators may be constructed as geared tracks, adjustment screws, hydraulic or pneumatic piston actuators, or the like. Still further, it should be appreciated that alternative arrangements of target adjustment frame and actuators may be employed for positioning of a target within the scope of the present invention. For example, base member 150 may be configured for lateral movement relative to base frame 46 and/or tower 156 may be configured for lateral movement relative to base member 150. Moreover, to the extent base frame 46 may be sufficiently precisely positioned longitudinally along rails 50a, 50b with rail actuators, system 20 may need not include actuator 152 for providing fine adjustment of the lateral position of base member 150 along rails 154.

System 20 may additionally include distance sensors, such as time-of-flight sensors, for monitoring and/or controlling the distance of target stand 38 to vehicle 34 or vehicle support stand 42. In the illustrated embodiment, laterally separated plates 172 (FIG. 8) may be provided on base frame 46 for use with distance sensors 174 (FIG. 2) configured as time-of-flight ("ToF") sensors on vehicle support stand 42, where in particular plates 172 are mounted to panels that rotate about the vertical axis with tower 160. As such, accurate distance information between the vehicle support stand 42 and target adjustment stand 38, and thereby vehicle 34 and its sensors 32 relative to a target 36 may be determined. The distance information may be used as a feedback loop in setting the target position relative to the vehicle. Alternatively, the distance between vehicle support stand 42 and target support stand 38 may be determined by an encoder, such as based on an electric drive system as discussed above for movement of target adjustment stand 38 relative to vehicle support stand 42. In yet another alternative embodiment, the distance of target adjustment stand 38 relative to vehicle support stand 42 may be manually set by an operator with, for example, target adjustment stand 38 then being fixed in position, such as by lock 142.

The operation of orienting a target 36 relative to the vehicle sensor 32 will now be further discussed with reference to FIGS. 10 and 11. Upon vehicle 34 being positioned or oriented and centered on stand 42 via the vehicle centering devices 66, 96, and upon system 20 obtaining vehicle information, such as by way of controller 40 and/or via a computer device such as a tablet computer plugged by an operator into an OBD port of vehicle 34, either or both of the controller 40 or the hand held tablet computer may provide instructions to the operator as to what specific target 36 to mount to target mount 44 for a given vehicle sensor 32 that is to be calibrated. Each target 36 may be provided with a radio-frequency identification ("RFID") tag and the operating program of system 20 may require confirmation that a correct target is selected. For example, the operator may use the hand held tablet, controller, or a handheld scanner or the like that is interfaced with controller 40 and/or interfaced with the handheld tablet or controller, to scan the target 36 to confirm selection of the correct target 36 for calibration of a particular sensor 32 of vehicle 34. As understood from FIG. 10, the operator then hangs target 36 on target mount 44 with target support stand 38 in an initial position.

Figure 11:
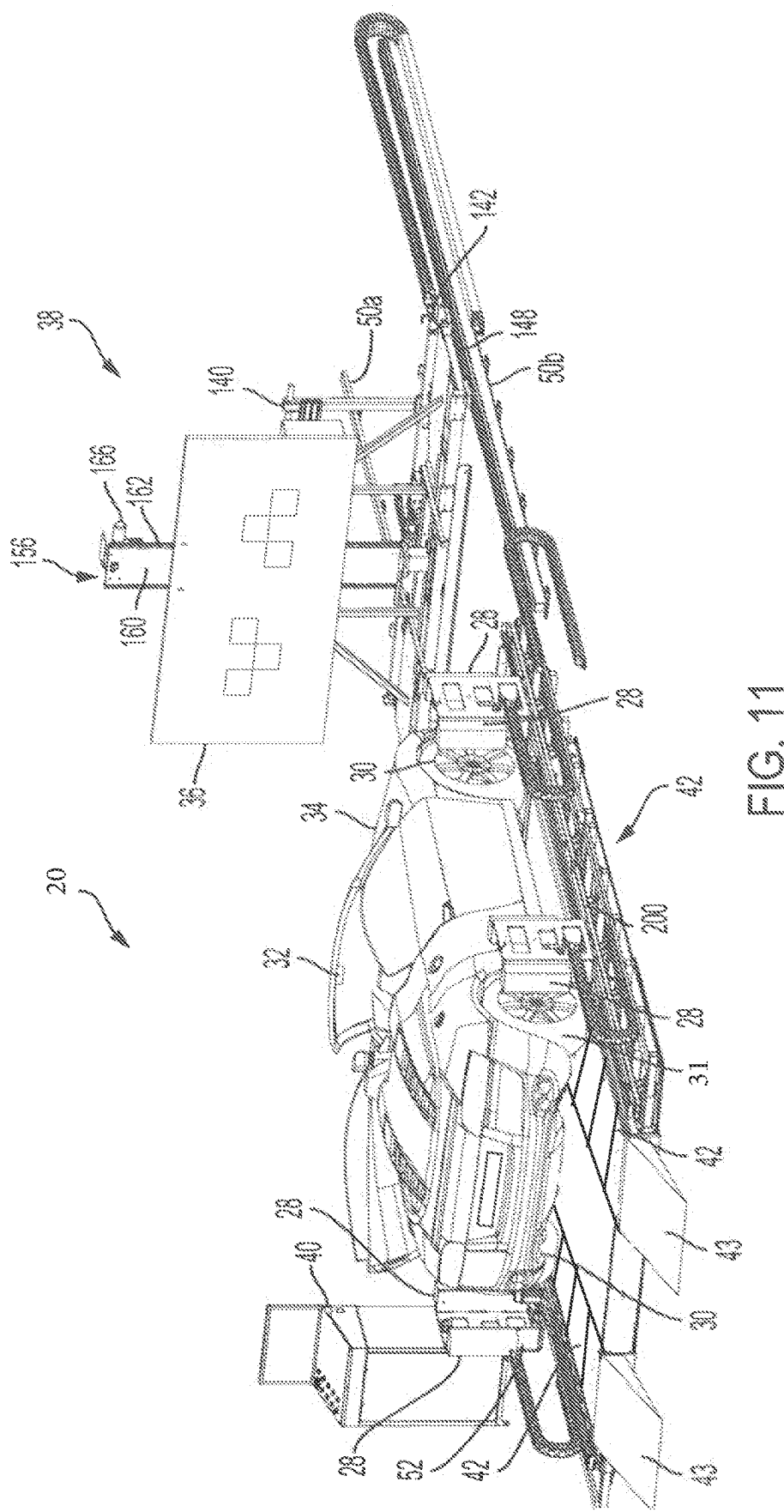

System 20 may then provide instructions to the operator to position the target support stand 38 into a rough orientation relative to vehicle support stand 42, such as shown in FIG. 11. For example, either the controller 40 an/or a handheld computing device may provide instructions to the operator to manually move the target support stand 38 along rails 50a, 50b via handle 140 and to then fix the target support stand 38 into position via lock 142. This positioning may be confirmed via distance sensors 174. Either controller 40 and/or the handheld computer device may then provide signals to controller 144 for precisely adjusting the target 36 via actuators 152, 158, 166 and 170 so as to orient the target 36 relative to the sensor 32 based on the established orientation or position of vehicle 34 on vehicle support stand 42, including based on the known and defined orientation of the vehicle support stand 42 to target adjustment stand 38, and the defined position of target 36 for the position of the ADAS sensor 32 on vehicle 34, such as based on OEM calibration procedures. In particular, as discussed above, with vehicle 34 being positioned and centered into a known orientation by way of the forward wheel support and centering assembly 56 and rearward wheel support and centering assembly 58. Alternatively, controller 40 may transmit vehicle information regarding the vehicle under test to a remote computer, such as to a remote server via an Internet connection, with the remote computer in turn transmitting position information instructions to controller 144 to position target 36 via actuators 152, 158, 166 and 170, and including actuators for automatically moving target frame 36 along rails 50a, 50b. Upon accurately positioning target 36 taking into account the orientation of vehicle 34 on forward and rearward support and centering assemblies 56, 58 of support stand 42, a calibration procedure or program may be initiated and run. For example, via the connection with the diagnostic port of vehicle 34, one or more vehicle computers may be initiated to perform a calibration routine that is set and supplied by the OEM whereby the sensor becomes calibrated for use with the vehicle 34.

In accordance with an aspect of the invention, target adjustment stand 38 may be configured for only lateral movement of target mount 44 along rails 168 via actuator 170, and for vertical movement of target support assembly 164 along rails 162 of tower 160 via actuator 166, without the need for rotation of tower 160 about its vertical axis. In such an embodiment, the orientation of track 48, and thus rails 50a, 50b, relative to vehicle support stand 42 are sufficiently centered, with base frame 46 being thus sufficiently perpendicular to vehicle support stand 42, and in particular to a vehicle 34 centered thereon, whereby no vertical rotational movement is required. Still further, as noted above, the longitudinal positioning of base frame 46 along track 48 relative to vehicle support stand 42, and thus vehicle 34 and sensor 32 thereon, may be sufficiently accurate for purposes of calibration whereby target adjustment stand 38 need not require or include the lateral fine positioning of tower 160 provided by movement of base member 150 along rails 154 via actuator 152. Accordingly, in such a configuration tower 160 may be fixedly secured to base frame 46 with horizontal rail 168 being perpendicularly arranged to track 48. In such an embodiment target adjustment stand 38 thus controls the vertical and lateral positioning of target 36.

Figure 10:
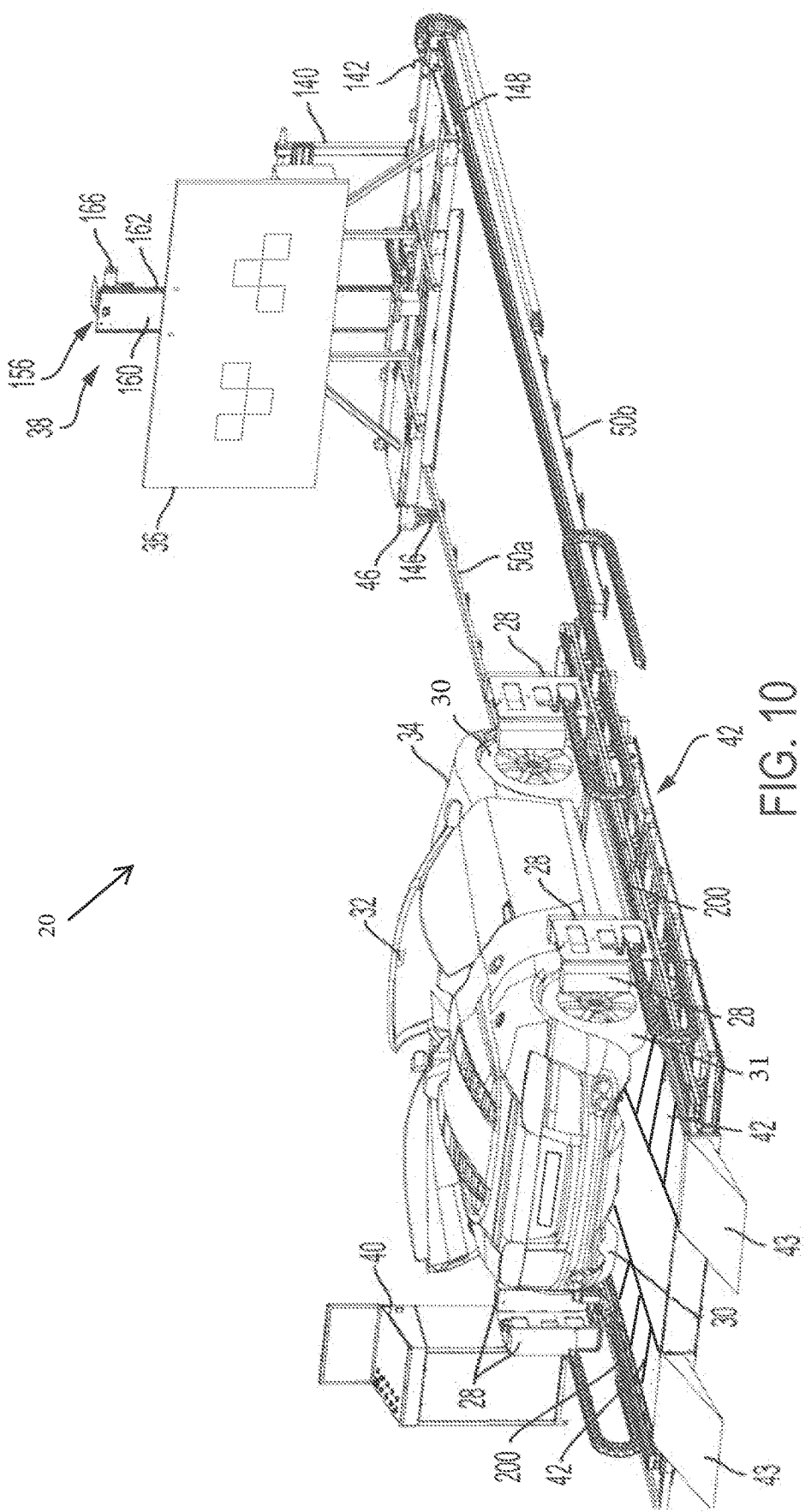
FIGS. 10 and 11 are perspective views of the system of FIG. 1 with the target adjustment stand shown in a first position and a second position relative to a vehicle and with a calibration target mounted thereto.

FIGS. 10 and 11 further illustrate that optionally system 20 may additionally utilize non-contact wheel alignment sensors on vehicle support stand 42 for determining specific information regarding the orientation of the vehicle, where in the illustrated embodiment pairs of non-contact wheel alignment sensors 28 are disposed about the opposed front wheel assemblies 30 and the opposed rear wheel assemblies 31, respectively. The non-contact wheel alignment sensors 28 are utilized to obtain position information of vehicle 34 on stand 42, which is provided to controller 144 and/or controller 40, with controller 144 in turn operating target adjustment stand 38 to position a target 36 relative to a sensor 32 of vehicle 34.

The wheel alignment sensors 28 may be used for determining the vertical center plane of the vehicle 34, as well as or part of the determination of wheel alignment characteristics such as toe, camber, caster, steering axis inclination (SAI), as well as the wheel center, axis of symmetry, and rear thrust angle. In the illustrated embodiment of system 20, eight non-contact wheel alignment sensors 28 are shown disposed about vehicle 34, it should be appreciated that alternative arrangements may be employed. For example, an alternative arrangement may employ non-contact wheel alignment sensors at just two wheel assemblies of vehicle 34, such as opposed wheel assemblies. The rear thrust angle may be determined using sensors 28 by, for example, rotating the rear tire and wheel assemblies 31 into two or more positions, such as by rotating the assemblies 31 on rear wheel support and centering assembly 58.

As understood from FIGS. 10 and 11, in the illustrated embodiment each wheel assembly 30, 31 includes a pair of cooperatively operating individual non-contact wheel alignment sensors 28 arranged to be disposed on the left and right sides of a given wheel assembly 30, 31 of vehicle 34. In the illustrated embodiment of FIGS. 10 and 11 non-contact wheel alignment sensors 28 are constructed in accordance with U.S. Pat. Nos. 7,864,309, 8,107,062 and 8,400,624, which are incorporated herein by reference. NCA sensors 28 project illumination lines onto either side of the tire and receive reflections of the illumination lines, by which the non-contact wheel alignment system is able to determine the orientation of the tire and wheel assembly 30, 31. The multiple illumination lines projected onto the tire and wheel assembly 30, 31 and the position of those lines in the acquired image enable the three dimensional spatial orientation or geometry of the tire and wheel assembly 30, 31 to be calculated throughout the working area of the sensors 28 based on the field and depth of view of the sensors. The use of corresponding NCA sensors 28 positioned about all four tire and wheel assemblies 30, 31 of vehicle 34 enable vehicle position information to be determined by the non-contact wheel alignment system, which may be based on a known orientation of the NCA sensors 28 disposed about vehicle 34 on stand 42. Rearward non-contact wheel alignment sensors 28 may be longitudinally adjustable, such as along tracks 200, to accommodate vehicles of differing wheelbase length. As noted, the wheel alignment and vehicle position information is provided to a controller, such as controller 40, or to a remote computing device, such as via the Internet. In response to the wheel assembly alignment and vehicle position information, the controller 40 or a remote computing device may then operatively send signals for operating the target adjustment stand 38 to position a target 36 relative to a sensor 32 of vehicle 34.

The determination of reference points for locating of targets 36 relative to a vehicle 34 on support stand 42 may be done via a calibration process. In one example of a calibration process, a calibration master may be positioned on the support stand 42, where the master 34a may be a specifically configured object having known dimensions or a vehicle that is accurately measured and is disposed in a known position on stand 42 via use of the forward and rearward wheel support and centering assemblies 56, 58. The master may also be equipped with a light projector that is accurately oriented to the centerline of the calibration master, with the calibration master configured such that the light projector directs a light to align the centerline of the master with a target 36 held by the target support stand 38. For example, a target 36 held by the target support stand 38 may be oriented into position by moving the stand 38 until the light projected from the master impinges upon a desired location of the target 36, whereby the controller 40 is "taught" the particular location and is operable to position targets accordingly. Alternatively, during calibration the target support stand 38 may optionally be moved between two distances referenced as "Position 1" and "Position 2" for aligning the target 36 with the calibration master.

For example, at Position 1 the target support stand 38 may be adjusted to align the target 36 into a desired orientation relative to the light projector, such as by jogging the position of the stand 38 to position the target 36 whereby the projected light impinges at a desired location. The target adjustment stand 38 is then moved to Position 2 and the stand 38 is again adjusted to align the target 36 into the desired orientation relative to the light projector by jogging the position of the stand 38 to position the target 36 whereby the projected light again impinges at the desired location. In this manner the axis of the calibration master to the target 36 is established and known. As discussed herein, there may be a calibration master for each type of vehicle (e.g., automobile, pickup truck, van), or in the alternative, there may be a calibration master for each make and model of vehicle to undergo alignment/calibration.

The above discussed alignment and calibration system 20 may be configured to operate independently of external data, information or signals, in which case the computer system of the embodiment that comprises the noted controller 40 may be programmed for operation with various makes, models and equipped sensors, as well as may include use of an operator computer device. In such a standalone configuration, an operator computer device may interface with vehicle 34, such as via one or more ECUs of vehicle 34 that may be interfaced via an on-board diagnostic (OBD) port of vehicle 34, as well as with controller 40 to provide instructions to an operator and run system for alignment/calibration of sensor 32. Alternatively, an operator computer device may receive information input by an operator regarding vehicle 34, such as make, model, vehicle identification number (VIN) and/or information regarding the equipped sensors, such as by manual entry or scanning, with the operator computer device communicating such information to controller 40.

Alternative to such a standalone configuration, a remote interface configuration for system 20 may be employed, where system 20 is configured to interface with a remote computing device or system, such as a server, and one or more remote databases, such as may be accessed via an Internet connection, whereby the computer system thus further comprise the remote computing device. For example, a remote computing device incorporating a database accessed via the Internet, may be used to run a calibration sequence through one or more engine control units ("ECUs") of the vehicle 34 to calibrate one or more ADAS sensors pursuant to pre-established programs and methodologies, such as based on original factory-employed calibration sequences or based on alternative calibration sequences. In such a configuration, controller 40 need not contain programs related to target positioning parameters for particular makes, models and equipped sensors. Rather, an operator may connect an operator computer device to an ECU of vehicle 34, such as via an OBD port, with the operator computer device then transmitting acquired vehicle specific information to the remote computing system, or alternatively an operator may enter information directly into an operator computer device without connecting to vehicle 34 for transmitting to the remote computing system. Such information may be, for example, make, model, vehicle identification number (VIN) and/or information regarding the equipped sensors. The remote computing system may then provide the necessary instructions to the operator based on specific procedures required to calibrate sensors as set forth in databases associated with the remote computing system and specific processing performed by the remote computing system, with control signals then transmitted to controller 40. For example, the remote computing system may provide instructions to controller 40 for positioning of target 36 via target adjustment stand 38, as well as to run an OEM calibration sequence of sensor 32, such as via a vehicle ECU.

The remote databases may thus contain information for performing calibration processes, including, for example, information regarding the specific target to be used for a given vehicle and sensor, the location at which the target is to be positioned by target adjustment stand 38 relative to such a sensor and vehicle, and for performing or activating the sensor calibration routine. Such information may be in accordance with OEM processes and procedures or alternative processes and procedures. In either embodiment various levels of autonomous operation by system 20 may be utilized.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A system for aligning a target to an equipped vehicle for calibration of a sensor on the equipped vehicle, said system comprising:
   a vehicle support stand upon which an equipped vehicle is stationarily disposed in an established known position on said vehicle support stand for calibration of a sensor on the equipped vehicle;
   a target adjustment stand including a base frame, a target mount moveably mounted on said base frame with said target mount configured to support a target, said target adjustment stand further including a plurality of actuators configured to selectively move said target mount relative to said base frame, and wherein said base frame is longitudinally moveable relative to said vehicle support stand along a track;
   wherein said target adjustment stand is configured to position said target into a calibration position relative to the sensor on the equipped vehicle by longitudinal movement of said base frame relative to said vehicle support stand and by movement of said target mount based on the established known position of the equipped vehicle on said vehicle support stand whereby the sensor is able to be calibrated using said target.

2. The system of claim 1, wherein said vehicle support stand comprises opposed locator arms with said locator arms being extendable and retractable and configured to press against tire and wheel assemblies of the equipped vehicle to orient the equipped vehicle on said vehicle support stand, and wherein said locator arms are configured to extend equally in opposite directions from each other.

3. The system of claim 2, wherein said vehicle support stand comprises forward tire supports and rearward tire supports upon which the opposed sets of tires of the equipped vehicle are disposed, wherein the forward tire supports comprise forward rollers and/or the rearward tire supports comprise rearward rollers, and wherein the axis of rotation of the forward rollers and/or the axis of rotation of the rearward rollers is aligned with the longitudinal axis of the equipped vehicle.

4. The system of claim 3, wherein said forward tire supports comprises a pair of forward tire supports upon which each of the forward opposed sets of tires of the equipped vehicle are disposed, and wherein each said forward tire support comprises two sets of rollers, and wherein said two sets of rollers of each said forward tire support are angled together in a V-shaped configuration for locating the equipped vehicle.

5. The system of claim 1, wherein said vehicle support stand comprises a forward centering device, wherein said forward centering device is disposed beneath the equipped vehicle when the equipped vehicle is disposed on said vehicle support stand, and wherein said forward centering device comprises a pair of locator arms configured to extend outwardly synchronously to engage an inner side of the forward tire and wheel assemblies of the equipped vehicle.

6. The system of claim 5, wherein said vehicle support stand comprises a rearward centering device, wherein said rearward centering device is disposed beneath the equipped vehicle when the equipped vehicle is disposed on said vehicle support stand, and wherein said rearward centering device comprises a pair of locator arms configured to extend outwardly synchronously to engage an inner side of the rearward tire and wheel assemblies of the equipped vehicle.

7. The system of claim 1, wherein said vehicle support stand further comprises non-contact wheel alignment sensors configured to be disposed on opposite sides of the vehicle, wherein said non-contact wheel alignment sensors are operable to determine vehicle orientation information to determine the established known position of the equipped vehicle for use in positioning said target into said calibration position.

8. The system of claim 1, further comprising a controller configured to selectively actuate said actuators to position said target, wherein said actuators are operable to move said target mount at least one of laterally with respect to a longitudinal axis of the vehicle when positioned in front of said target adjustment stand, vertically, longitudinally on said base frame, or rotationally about a vertical axis.

9. The system of claim 1, wherein said target adjustment stand includes a horizontal rail and a vertical rail, and wherein said actuators comprise a horizontal actuator and a vertical actuator with said horizontal actuator configured to move said target mount horizontally via said horizontal rail and with said vertical actuator configured to move said target mount vertically via said vertical rail.

10. The system of claim 9, wherein said target mount is attached to said horizontal rail and wherein said horizontal rail is attached to said vertical rail.

11. The system of claim 1, wherein said target adjustment stand includes a base member movably mounted to said base frame and a tower joined to said base member with said target mount supported by said tower, and wherein said actuators comprise a tower actuator configured to selectively rotate said tower relative to said base frame, and further including a controller configured to actuate said tower actuator to position the target based on the orientation of the vehicle on said vehicle support stand.

12. The system of claim 11, further including a target mount rail disposed on said tower and wherein said actuators further comprise a first target mount actuator and a second target mount actuator, wherein said first target mount actuator is operable to move said target mount laterally along said target mount rail and said second target mount actuator is operable to adjust the vertical orientation of said target mount.

13. The system of claim 1, further including distance sensors, wherein said distance sensors are operable to determine the distance between said vehicle support stand and said target adjustment stand.

14. A method for aligning a target to an equipped vehicle for calibration of a sensor on the equipped vehicle, said method comprising:

maneuvering an equipped vehicle onto a vehicle support stand, where the equipped vehicle includes a sensor and is stationarily disposed on the vehicle support stand;

moving a target held by a target adjustment stand into a calibration position for calibration of the sensor based on an established known position of the equipped vehicle on the vehicle support stand;

wherein the target adjustment stand is moveable longitudinally along a track relative to the longitudinal axis of the equipped vehicle on the vehicle support stand, and wherein the target adjustment stand includes a base frame, a target mount moveably mounted on said base frame with said target mount configured to support a target, said target adjustment stand further including a plurality of actuators configured to selectively move said target mount relative to said base frame.

15. The method of claim 14, further comprising orienting the equipped vehicle on the vehicle support stand, wherein said vehicle support stand comprises opposed locator arms with said locator arms being extendable and retractable and configured to press against tire and wheel assemblies of the equipped vehicle to orient the equipped vehicle on said vehicle support stand, and wherein said locator arms are configured to extend equally in opposite directions from each other.

16. The method of claim 14, wherein said actuators are operable to move said target mount at least one of laterally with respect to a longitudinal axis of the vehicle when positioned in front of said target adjustment stand, vertically, longitudinally on said base frame, or rotationally about a vertical axis.

17. The method of claim 14, wherein said target adjustment stand includes a horizontal rail and a vertical rail, and wherein said actuators comprise a horizontal actuator and a vertical actuator with said horizontal actuator configured to move said target mount horizontally via said horizontal rail and with said vertical actuator configured to move said target mount vertically via said vertical rail.

18. The method of claim 14, wherein said target adjustment stand includes a base member movably mounted to said base frame and a tower joined to said base member with said target mount supported by said tower, and wherein said actuators comprise a tower actuator configured to selectively rotate said tower relative to said base frame, and further including a controller configured to actuate said tower actuator to position the target based on the orientation of the vehicle on said vehicle support stand.

19. The method of claim 18, further including a target mount rail disposed on said tower and wherein said actuators further comprise a first target mount actuator and a second target mount actuator, wherein said first target mount actuator is operable to move said target mount laterally along said target mount rail and said second target mount actuator is operable to adjust the vertical orientation of said target mount.

20. The method of claim 14, wherein said vehicle support stand further includes non-contact wheel alignment sensors configured to be disposed on opposite sides of the vehicle, wherein said non-contact wheel alignment sensors are configured for use in determining the orientation of the vehicle on the vehicle support stand for positioning of the target.

* * * * *